United States Patent [19]

Steven J. Frank et al.

[11] Patent Number: 5,251,308
[45] Date of Patent: Oct. 5, 1993

[54] SHARED MEMORY MULTIPROCESSOR WITH DATA HIDING AND POST-STORE

[75] Inventors: Steven J. Frank, Hopkinton; Henry Burkhardt, III, Manchester; James B. Rothnie, Brookline; Benson I. Margulies, Arlington; Frederick D. Weber, Concord; Linda Q. Lee, Cambridge; Glen Dudek, Woburn; William F. Mann, Sudbury; Edward N. Kittlitz, Cambridge; Ruth Shelley, Upton, all of Mass.

[73] Assignee: Kendall Square Research Corporation, Waltham, Mass.

[21] Appl. No.: 370,287

[22] Filed: Jun. 22, 1989

Related U.S. Application Data

[63] Continuation-in-part of Ser. No. 136,930, Dec. 22, 1987, Pat. No. 5,055,999.

[51] Int. Cl.⁵ .............................................. G06F 13/00
[52] U.S. Cl. ................................ 395/425; 364/DIG. 1
[58] Field of Search ... 364/200 MS File, 900 MS File; 395/400, 425

[56] References Cited

U.S. PATENT DOCUMENTS

| Re. 28,811 | 5/1976 | Fierce | 179/15 |
|---|---|---|---|
| 3,713,096 | 1/1973 | Comfort et al. | 340/172 |
| 3,723,976 | 3/1973 | Alvarez et al. | 395/400 |
| 3,731,002 | 5/1973 | Pierce | 370/85 |
| 3,735,362 | 5/1973 | Ashay et al. | 340/172 |
| 3,748,647 | 7/1973 | Ashany et al. | 340/172 |
| 4,011,545 | 3/1977 | Nadir | 340/172 |
| 4,031,512 | 6/1977 | Faber | 340/147 |
| 4,077,059 | 2/1978 | Cordi et al. | 364/200 |
| 4,141,067 | 2/1979 | McLagan | 364/200 |
| 4,240,143 | 12/1980 | Besemer et al. | 364/200 |
| 4,245,306 | 1/1981 | Besemer et al. | 364/200 |

(List continued on next page.)

FOREIGN PATENT DOCUMENTS

| 0014926 | 2/1980 | European Pat. Off. |
| 0233993 | 4/1982 | European Pat. Off. |
| 0233993A | 4/1982 | European Pat. Off. |
| 0214718 | 3/1987 | European Pat. Off. |
| 0262750A2 | 4/1988 | European Pat. Off. |
| 0332818 | 1/1989 | European Pat. Off. |
| 0322117A | 9/1989 | European Pat. Off. |
| 103166 | 6/1984 | Japan |
| 8808652A | 1/1989 | PCT Int'l Appl. |
| 8909446 | 10/1989 | PCT Int'l Appl. |
| 9000283 | 1/1990 | PCT Int'l Appl. |
| 2065941 | 7/1981 | United Kingdom |
| 2176918A | 1/1987 | United Kingdom |
| 2178205 | 2/1987 | United Kingdom |

OTHER PUBLICATIONS

Lovett et al., Proceedings of '88 Int'l. Conf. on Parrell Proc., vol. 1, Penn State Univ. Press (Conf. Aug. 15-19'88) pp. 303 et seq.

Kai Li et al., Proceedings '89 Int'l. Conf. on Parallel Processing, Penn State Univ. Press (Conf. Aug. 8-12'89) pp. 1-125 et seq.

(List continued on next page.)

*Primary Examiner*—Joseph L. Dixon
*Assistant Examiner*—Rebecca L. Rudolph
*Attorney, Agent, or Firm*—Lahive & Cockfield

[57] ABSTRACT

A digital data processing system includes a plurality of central processor units which share and access a common memory through a memory management element. The memory management element permits, inter alia, data in the common memory to be accessed in at least two modes. In the first mode, all central processing units requesting access to a given datum residing in memory are signalled of the datum's existence. In the second mode, only selected central processing units requesting access to a resident datum are notified that it exists, while others requesting access to the datum are signalled that it does not exist. The common memory can include a plurality of independent memory elements, each coupled to and associated with, a respective one of the central processing units. A central processing unit can include a post-store element for effecting the transfer of copies of data stored in its associated memory element to a memory element associated with another central processing unit.

20 Claims, 7 Drawing Sheets

U.S. PATENT DOCUMENTS

| | | | |
|---|---|---|---|
| 4,293,910 | 10/1981 | Fhasche et al. | 364/200 |
| 4,322,795 | 3/1982 | Lange et al. | 364/200 |
| 4,334,305 | 6/1982 | Girardi | 370/86 |
| 4,394,731 | 6/1983 | Flusche et al. | 364/200 |
| 4,410,946 | 10/1983 | Spencer | 364/200 |
| 4,468,733 | 8/1984 | Oka et al. | 395/200 |
| 4,484,262 | 11/1984 | Sullivan et al. | 364/200 |
| 4,503,497 | 3/1985 | Kryqowski et al. | 364/200 |
| 4,510,492 | 4/1985 | Mori et al. | 370/85 |
| 4,598,400 | 7/1986 | Hillis | 370/60 |
| 4,622,631 | 11/1986 | Frank et al. | 395/425 |
| 4,625,081 | 11/1986 | Lotito et al. | 379/88 |
| 4,646,271 | 2/1987 | Uchiyama et al. | 365/49 |
| 4,700,347 | 10/1987 | Rettberg et al. | 371/1 |
| 4,701,756 | 10/1987 | Burr | 370/60 |
| 4,706,080 | 11/1987 | Sincoskie | 370/94 |
| 4,714,990 | 12/1987 | Desyllas et al. | 395/425 |
| 4,734,907 | 3/1988 | Turner | 370/60 |
| 4,754,394 | 6/1988 | Brantley, Jr. et al. | 364/200 |
| 4,780,873 | 10/1988 | Mattheyses | 395/425 |
| 4,783,731 | 11/1988 | Miyazaki et al. | 364/200 |
| 4,797,880 | 1/1989 | Bussey, Jr. et al. | 370/60 |
| 4,804,694 | 8/1986 | Hough | 364/200 |
| 4,811,009 | 3/1989 | Orimo et al. | 370/85 |
| 4,814,970 | 3/1989 | Barbagelata et al. | 364/200 |
| 4,829,227 | 5/1989 | Turner | 370/60 |
| 4,845,702 | 7/1989 | Melindo | 370/1 |
| 4,885,742 | 12/1989 | Yano | 370/94 |
| 4,951,193 | 8/1990 | Muramatsu et al. | 364/200 |
| 4,984,235 | 1/1991 | Hillis et al. | 370/60 |
| 5,025,366 | 6/1991 | Baror | 395/250 |

OTHER PUBLICATIONS

Papamarcos et al., Proc. of 11th Annual Symposium on Computer Architecture (Conf. Jun. 5-7'84) pp. 348 et seq (IEEE).

Proc. of the 6th Annual Phoenix Conf. on Computers and Communications, 25-27 Feb. 1987, pp. 14-17.

"Multi-Microprocessors: An Overview . . . " IEEE vol. 26 #2, pp. 216-228.

"Cm*—A Modular Multi-Microprocessor," Nat'l Comp Confr '77, 637-644.

Ciepeilewsik et al., "A Formal Model for Or-Parallel . . . ", Proc. of the IFIP 9th World Computer Congress (1983) pp. 299-305.

Censier et al., "A New Solution to Coherence . . . ", IEEE Transaction on Computers, vol. c-28, No. 12 (Dec. 1978) pp. 1112-1118.

Eggers et al., "Evaluating the Performance of Four . . . ", Proc. of the 16th Annual Int'l Symposium on Computer Archit. (1989) pp. 2-15.

"High Performance/High Availability Interprocessor Communication Method," IBM Technical Disclosure Bulletin, vol. 31, No. 2, Jul. 1988 pp. 41-42.

Haridi et al, "The Cache Coherence Protocol of the Data Diffusion Machine" Parallel Architectures Proceedings, vol. 1, pp. 1-18 (1989).

Warren et al, "Data Diffusion Machine-A Scalable . . . ", Proceedings of the International Conference on Fifth . . . , 1988, pp. 943-952.

Hagersten, "Some Issues on Cache-Only Memory Architecture," Scalable Shared-Memory Multiprocessors, May 1990, p. 12.

Hagerstein et al, "The Data Diffusion Machine and Its Data Coherency Protocols," Proceedings of the IFIP, pp. 127-148 (1990).

Gehringer et al., "The Cm* Hardware Architecture", Parallel Proc. the Cm* Experience, Digital Press, pp. 11-28, 432, 438.

Goodman et al., "The Wisconsin Multicube: A New . . . ", Proc. of the 15th Annual Int'l Symposium on Computer Archit. (1988) pp. 422-431.

Mizrahi et al., "Introducing Memory into the Switch . . . ", Proc. of the 16th Annual Int'l Symposium on Computer Archit. (1989) pp. 158-166.

Pfister et al., "The IBM Research Parallel Processor . . . ", IEEE Proc. of the 1985 Int'l Conf. on Parallel Proc. (1985) pp. 764-771.

Tabak, "Chapter 8 Bus-Oriented Systems", Multiprocessors, Prentice Hall (1990) pp. 92-102.

Wilson, Sr. Editor, "Increased CPU Speed Drives Changes in Multiprocessor Cache and Bus Designs", Computer Design, (Jun. 1987) p. 20.

Ali et al., "Global Garbage Collection for Distributed . . . ", Int'l Jo. of Parallel Programming, vol. 15, No. 5 (1986) pp. 339-387.

| PROCESSOR OPERATION | SC STATE | HIT/MISS | NOTES | NEW SC STATE |
|---|---|---|---|---|
| LD.RO | INVALID | MISS | SVA_SC_RO REQUEST, DATA FROM SUBCACHE | RO/EX* |
| LD.RO | READ-ONLY | HIT | DATA FROM SUBCACHE | NO CHANGE |
| LD.RO | EXCLUSIVE | HIT | DATA FROM SUBCACHE | NO CHANGE |
| LD.EX | INVALID | MISS | SVA_L_SC_EX REQUEST, DATA FROM SUBCACHE | RO/EX* |
| LD.EX | READ-ONLY | HIT | DATA FROM SUBCACHE | NO CHANGE |
| LD.EX | EXCLUSIVE | HIT | DATA FROM SUBCACHE | NO CHANGE |
| ST | INVALID | MISS | SVA_S_SC_EX REQUEST, DATA TO SUBCACHE | EXCLUSIVE |
| ST | READ-ONLY | MISS | SVA_S_SC_EX REQUEST, DATA TO SUBCACHE | EXCLUSIVE |
| ST | EXCLUSIVE | HIT | DATA TO SUBCACHE | NO CHANGE |
| LD64.RO.SC | INVALID | MISS | SVA_SC_RO_REQUEST, DATA FROM SUBCACHE | RO/EX* |
| LD64.RO.SC | READ-ONLY | HIT | DATA FROM SUBCACHE | NO CHANGE |
| LD64.RO.SC | EXCLUSIVE | HIT | DATA FROM SUBCACHE | NO CHANGE |
| LD64.EX.SC | INVALID | MISS | SVA_L_SC_EX REQUEST, DATA FROM SUBCACHE | RO/EX* |
| LD64.EX.SC | READ-ONLY | HIT | DATA FROM SUBCACHE | NO CHANGE |
| LD64.EX.SC | EXCLUSIVE | HIT | DATA FROM SUBCACHE | NO CHANGE |
| LD64.RO.NSC | INVALID | MISS | SVA_NSC_RO REQUEST, DATA FROM SUBCACHE | NO CHANGE |
| LD64.RO.NSC | READ-ONLY | HIT | DATA FROM SUBCACHE | NO CHANGE |
| LD64.RO.NSC | EXCLUSIVE | HIT | DATA FROM SUBCACHE | NO CHANGE |
| LD64.EX.NSC | INVALID | MISS | SVA_NSC_EX REQUEST, DATA FROM SUBCACHE | NO CHANGE |
| LD64.EX.NSC | READ-ONLY | HIT | DATA FROM SUBCACHE | NO CHANGE |
| LD64.EX.NSC | EXCLUSIVE | HIT | DATA FROM SUBCACHE | NO CHANGE |
| ST64.SC | INVALID | MISS | STORE_SC REQUEST, DATA TO SUBCACHE | EXCLUSIVE |
| ST64.SC | READ-ONLY | MISS | STORE_SC REQUEST, DATA TO SUBCACHE | EXCLUSIVE |
| ST64.SC | EXCLUSIVE | HIT | DATA TO SUBCACHE | NO CHANGE |
| ST64.NSC | INVALID | MISS | STORE_NSC REQUEST, DATA TO CACHE | NO CHANGE |
| ST64.NSC | READ-ONLY | MISS | STORE_NSC REQUEST, DATA TO CACHE | INVALID |
| ST64.NSC | EXCLUSIVE | HIT | DATA TO SUBCACHE | NO CHANGE |
| PSTSP | INVALID | MISS | NO CACHE REQUEST | NO CHANGE |
| PSTSP | READ-ONLY | MISS | NO CACHE REQUEST | NO CHANGE |
| PSTSP | EXCLUSIVE | HIT | PDC_WB_NEX REQUEST | READ ONLY |

\* RO/EX - IF THE LOCAL CACHE HAS READ-ONLY OR NON-EXCLUSIVE STATE OR IF DESCRIPTOR.NO_WRITE IS SET, THE SUBCACHE OBTAINS READ-ONLY. IF THE LOCAL CACHE HAS AN EXCLUSIVE-OWNERSHIP STATE AND DESCRIPTOR.NO_WRITE IS CLEAR, SUBCACHE OBTAINS EXCLUSIVE STATE. IF LOCAL CACHE HAS INVALID STATE, IT ISSUES THE APPROPRIATE REQUEST; WHEN THE SUBPAGE BECOMES VALID, THE PRECEEDING RULES ARE FOLLOWED.

*FIG. 5*

SHARED MEMORY MULTIPROCESSOR WITH DATA HIDING AND POST-STORE

This application is a continuation in part of United States Patent Application Serial No. 07/136,930, now U.S. Pat. No. 5,055,999, filed Dec. 22, 1987, for "MULTIPROCESSOR DIGITAL DATA PROCESSING SYSTEM," and assigned to the assignee hereof.

REFERENCE TO RELATED APPLICATIONS

This application is related to United States Patent application Serial No. 07/136,701 now U.S. Pat. No. 5,119,481, filed Dec. 22, 1987, for "INTERCONNECTION SYSTEM FOR MULTIPROCESSOR STRUCTURE," and assigned to the assignee hereof.

This application is related to U.S. Patent application No. 370,325, for "MULTIPROCESSOR SYSTEM WITH MULTIPLE INSTRUCTION SOURCES," and United States Patent application No. 370,341 for "MULTIPROCESSOR DIGITAL DATA PROCESSING SYSTEM," both applications of which are assigned to the assignee hereof and filed this same day herewith.

The teachings of the above-cited parent and related applications are incorporated herein by reference.

Reference to Appendices

This application is filed with four appendices entitled "Appendix A—Schematics and Logic for Cache Control Unit, e.g., Elements 74C and 74D of FIG. 2"; "Appendix B—Memory Control System Specification"; "Appendix C—Instruction Set Specification"; and "Appendix D—Control Locations Specification". These appenduces are available in the patented file. The disclosure of this patent document contains material which is subject to copyright and/or mask work protection. The owner thereof has no objection to facsimile reproduction by anyone of the patent document or the patent disclosure, as it appears in the U.S. Patent and Trademark Office patent file or records, but otherwise reserves all copyright and/or mask work rights whatsoever.

BACKGROUND OF THE INVENTION

This invention relates to digital data processing systems and, more particularly, to multiprocessing systems with distributed hierarchical memory architectures.

The art provides a number of configurations for coupling the processing units of multiprocessing systems. Among the earlier designs, processing units that shared data stored in system memory banks were coupled to those banks via high-bandwidth shared buses or switching networks. During periods of heavy usage, bottlenecks were likely to develop as multiple processing units simultaneously sought access to the shared data.

In order to minimize the risk of formation of transmission bottlenecks, distributed memory systems were developed coupling individual processing units with local memory elements to form semi-autonomous processing cells. To achieve the benefits of multiprocessing, some of the more recently designed systems established cell communications through utilization of hierarchical architectures.

Prior distributed memory systems permit multiple copies of single data items to reside within multiple processing cells; hence, it is difficult insure that all processing cells maintain up-to-date copies of identical data elements. Conventional efforts to resolve this problem, i.e., to preserve data coherency, rely upon software-oriented techniques utilizing complex signalling mechanisms.

To avoid processing and signalling overhead associated with these software-oriented solutions, Frank et al, U.S. Pat. No. 4,622,631, discloses a multiprocessing system in which a plurality of processors, each having an associated private memory, or cache, share data contained in a main memory element. Data within that common memory is partitioned into blocks, each of which can be owned by any one of the main memory and the plural processors. By definition, the current owner of a data block maintains the "correct," or most up-to-date, data for that block.

A hierarchical approach is disclosed by Wilson Jr. et al, United Kingdom Patent Application No. 2,178,205, wherein a multiprocessing system is said to include distributed cache memory elements coupled with one another over a first bus. A second, higher level cache memory, attached to the first bus retains copies of every memory location in the caches below it. Residing over the second level cache is a third, still higher level cache and the main system memory. Both the third level cache and the system main memory, in turn, retain copies of each memory location of the caches below them. Processors in the system are understood to transmit modified copies of data from their own dedicated caches to the associated higher level caches, as well as to the system main memory, while concurrently signalling other caches to invalidate their own copies of the newly-modified data.

Notwithstanding the solutions proposed by Frank et al and Wilson Jr. et al, both designers and users of multiprocessing systems still confront data coherency and bus contention issues. With respect to Wilson Jr. et al, for example, bus and memory contention are increased as the system processors strive to keep the main memory continually updated with each data modification.

Neither of the aforementioned prior art designs, moreover, are capable of supporting more than a limited number of processing units. This restriction in "scalability" arises because both Wilson Jr. et al and Frank et al require that the storage capacity of the main memory be increased to accommodate each additional processor.

It is therefore an object of this invention to provide an improved multiprocessing system with improved data coherency, as well as reduced latency and bus contention. A further object is to provide a multiprocessing system with unlimited scalability.

Another object of the invention is to provide a physically distributed memory multiprocessing system which requires little or no software overhead to maintain data coherency, as well as one with increased bus bandwidth and improved synchronization.

SUMMARY OF THE INVENTION

The aforementioned objects are attained by the invention, which provides, in one aspect, a digital data processing system including a plurality of central processor units which share and access a common memory through an interface termed a "memory management element."

The memory management element permits, inter alia, data in the common memory to be accessed in at least two modes. In the first mode, all central processing units requesting access to a given datum residing in memory are signalled of the datum's existence (though, not necessarily given access to it). In the second mode, only selected central processing units requesting access to a resident datum are notified that it exists, while others requesting access to the datum are signalled that it does not exist (i.e., as if it does not reside in memory).

In the first access mode, for example, if a first processing unit requests read/write access to a selected data element and, at the same time, a second processing unit requests read-only access to that same data element, the memory management element can signal both units that the requested element is stored in memory, permitting them to access the datum in the requested manner. Were this same data element in the second access mode when requested, on the other hand, the memory management would signal, for example, only the first central processing unit of the datum's existence, ignoring requests for it by the second central processing unit (or, alternatively, signalling the second CPU outright that the requested datum does not reside in memory).

Datum available for access under this second mode is referred to as "anchored." In one preferred embodiment of the invention described below, data are typically accessed in the first mode, with access under the second mode occurring less frequently, e.g., during the creation and destruction of descriptors.

According to one aspect of the invention, the central processing units can set the access mode for the shared data elements. Thus, for example, if a first central processing unit maintains exclusive access to a shared datum, that unit can anchor the data element, e.g., by setting its "anchor bit," and thereby force the memory management system to ignore requests for access to that datum by other central processing units, at least until such time that the bit is turned off.

In another aspect of the invention, the common memory can include a plurality of independent memory elements, each coupled to and associated with, a respective one of the central processing units. Each processing unit/memory element pair is referred to as a "processing cell" or, simply, a "cell." The memory management system selectively allocates storage and moves copies of data elements, some exclusively, from cell to cell in response to access requests generated by them.

According to a further aspect of the invention, the processing cells maintain directories of "descriptors" naming and describing attributes of each datum stored in their respective memory elements. One portion of each descriptor, includes an "anchor bit" which, as discussed above, can be set by the local central processing unit to determine which access mode (e.g., either "normal" or "anchored") is to be invoked for responding to access requests generated by other central processing units for specific items of data in the processing cell.

In still another aspect, the invention provides a digital data processing system having a plurality of processing cells and a memory management element, wherein at least a first central processing unit is capable of generating an ownership-request signal, and a second CPU is capable of generating a read-only request signal. The ownership-request signal represents a request for priority access to an information-representative signal, while the read-only request signal represents a request for secondary access to an information-representative signal stored for priority access in another of the processing cells.

The memory management element responds to the ownership-request signal from the first processor by allocating, exclusively, within its associated memory, physical storage space for a requested information-representative signal. The memory management element responds, further, to a read-only request for that same information-representative signal by the second central processing unit for transferring a read-only copy of the datum to the corresponding processing cell.

Upon initiation of a request by a post-store element within the first CPU, the memory management element transfers a copy of the first information-representative signal from its own memory to that associated with the second central processing unit.

A system of the type described above provides improved multiprocessing capability with reduced bus and memory contention. By dynamically allocating of exclusive data copies to processors requiring such access, as well as the sharing of data copies required concurrently by multiple processors, the system reduces bus traffic and data access delays. By providing the additional capability to anchor data elements and force "post-store" updates, the system affords greater program control of data movement. These and other aspects of the invention are evident in the description which follows.

BRIEF DESCRIPTION OF DRAWINGS

A more complete understanding of the invention may be attained by reference to the drawings, in which:

FIG. 5 presents a state table depicting handling of processor access requests directed to data stored in local caches in a digital data processing system constructed according to a preferred practice of the invention.

DETAILED DESCRIPTION OF THE ILLUSTRATED EMBODIMENT

System Structure and Operation

Figure 1A:
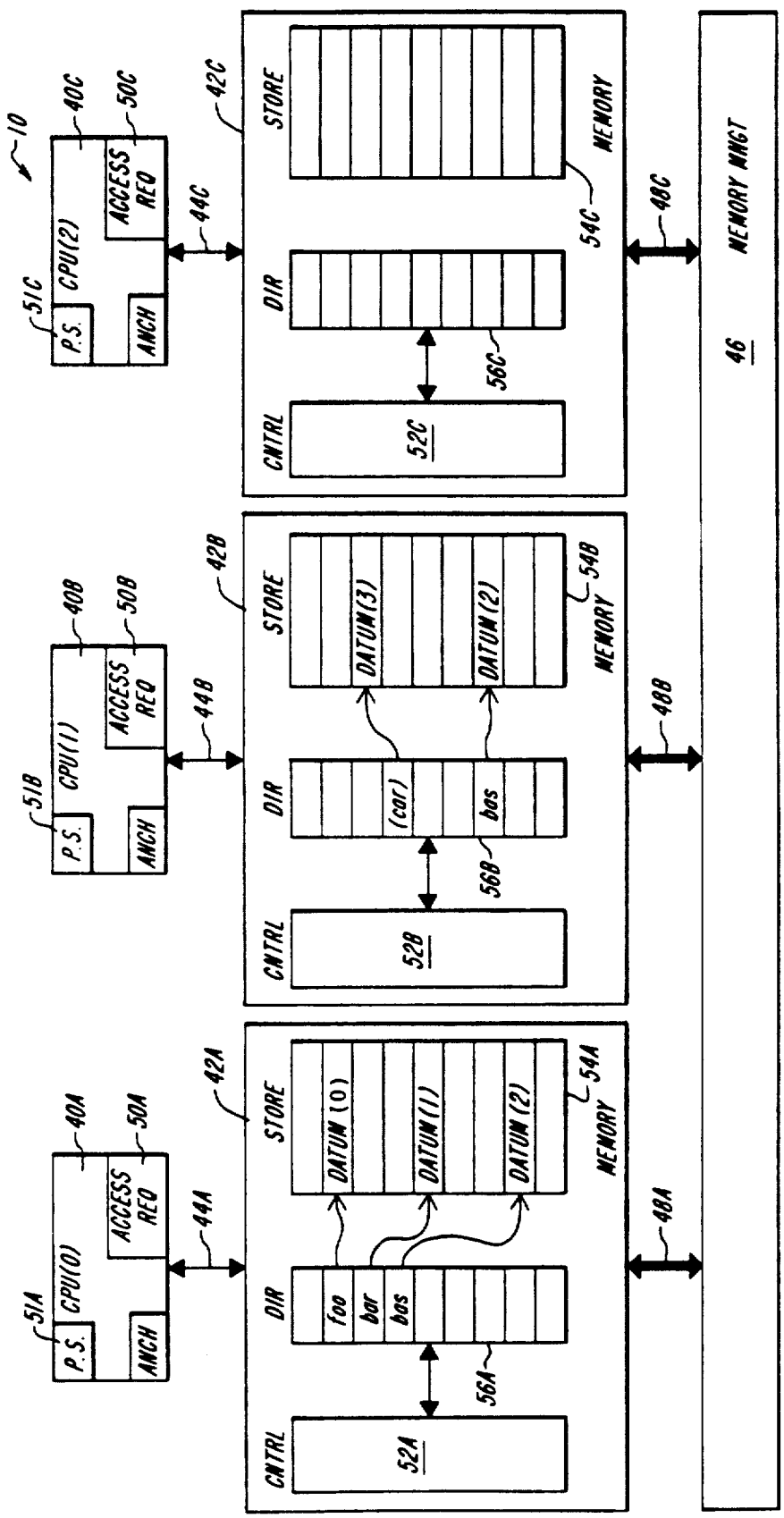
FIGS. 1A–1C depict a multiprocessor constructed in accord with a preferred practice of the invention.

FIG. 1A depicts a multiprocessor digital data processing system constructed in accord with a preferred practice of the invention. The illustrated system includes plural central processing units 40A, 40B and 40C coupled, respectively, to associated memory elements (or, caches) 42A, 42B and 42C. Communications between the processing and memory units of each pair are carried along buses 44A, 44B and 44C, as shown. The illustrated system further includes memory management element 46 for accessing information-representative signals stored in memory elements 44A, 44B and 44C via buses 48A, 48B and 48C, respectively.

In the illustrated system 10, the central processing units 40A, 40B and 40C each include an access request element, labelled 50A, 50B and 50C, respectively, as well as a post-store element, labelled 51A, 51B and 51C, respectively. The access request elements generate signals representative of requests for access to an information stored in the memory elements 42A, 42B and 42C. Among the types of access request signals generated by elements 50A, 50B and 50C is the ownership-request signal, representing requests for priority access to an information-representative signal The post-store elements 51A, 51B, 51C generate signals representative of requests for transfer of a copy of a datum, e.g., one which is exclusively owned in the associated processing cell and for which an invalid descriptor is allocated in another processing cell, to other caches. In a preferred embodiment, access request elements 50A, 50B and 50C and post-store elements 51A, 51B, and 51C comprise a subset of an instruction subset implemented on CPU's 40A, 40B and 40C and described below.

The memory elements 42A, 42B and 42C include control elements 52A, 52B and 52C, respectively. Each of these control units interfaces a data storage area 54A, 54B and 54C via a corresponding directory element 56A, 56B and 56C, as shown. Stores 54A, 54B and 54C are utilized by the illustrated system to provide physical storage space for data and instruction signals needed by their respective central processing units. Thus, store 54A maintains data and control information used by CPU 40A, while stores 54B and 54C maintain such information used by central processing units 40B and 40C, respectively. The information signals maintained in each of the stores are identified by unique descriptors which, preferably, correspond to the signals' system addresses. Those descriptors are stored in address storage locations of the corresponding directory. While the descriptors are considered unique, multiple copies of some descriptors may exist among the memory elements 42A, 4B and 42C where those multiple copies identify copies of the same data element.

Access request signals generated by the central processing units 40A, 40B and 40C include, along with other control information, an SVA request portion matching the SVA address of the requested information signal. The control elements 52A, 52B and 52C respond to access-request signals generated their respective central processing units 40A, 40B and 40C for determining whether the requested information-representative signal is stored in the corresponding storage element 54A, 54B and 54C. If so, that item of information is transferred for use by the requesting processor. If not, the control unit 52A, 52B, 52C transmits the access-request signal to said memory management element along lines 48A, 48B and 48C.

Each cache directory, e.g., 56A, acts as a content-addressable memory. This permits a cache, e.g., 42A, to locate a descriptor for a particular page of SVA space without an iterative search through all of its descriptors. Each cache directory is implemented as a 16-way set-associative memory with 128 sets. All of the pages of SVA space are divided into 128 equivalence classes, each associated with a cache directory set. A descriptor for a page can only be stored in the set of a cache directory that corresponds to the page's equivalence class. The equivalence class is selected by SVA[20:14], as discussed in greater detail below. At any given time, a cache can describe no more than 16 pages with the same value for SVA[20:14], since there are 16 elements in each set.

When a processing cell responds to a request for a subpage, it supplies, to the requesting unit, the subpage data, along with certain descriptor fields from the local cache. The requestor either copies those fields to its own descriptor area, if it has no other valid subpages, or logically OR's those fields into descriptor fields. Some descriptor fields are never supplied by the responder nor updated by the requestor.

Figure 2:
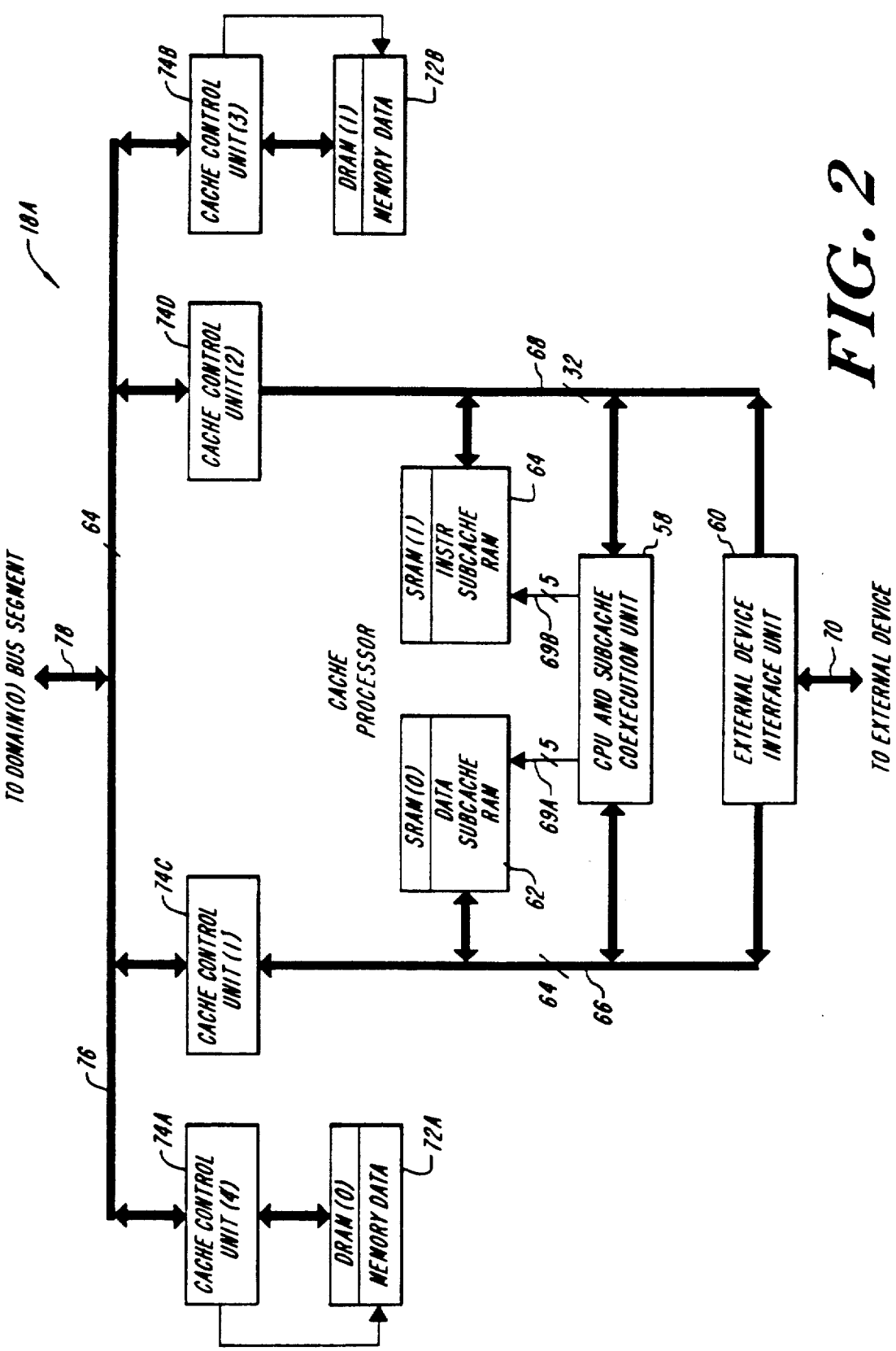
FIG. 2 depicts a preferred processing cell used in practicing the invention.

FIG. 2 depicts a preferred structure for an exemplary processing cell 18A for use in practicing the invention. The illustrated processing cell 18A includes a central processing unit 58, coupled with external device interface 60, data subcache 62 and instruction subcache 64 over processor bus 66 and instruction bus 68, respectively.

Processor 58 comprises any one of several commercially available processors, for example, the Motorola 68000 CPU, adapted to interface subcaches 62 and 64, under control of a subcache co-execution unit acting through data and address control lines 69A and 69B, and further adapted to execute memory instructions as described below.

Processing cell 18A further includes data memory units 72A and 72B coupled, via cache control units 74A and 74B, to cache bus 76. Cache control units 74C and 74D, in turn, provide coupling between cache bus 76 and processing and data buses 66 and 68. As indicated in the drawing, bus 78 provides an interconnection between cache bus 76 and the domain(0) bus segment 20A associated with illustrated cell.

In a preferred embodiment, data caches 72A and 72B are dynamic random access memory devices, each capable of storing up to 16 Mbytes of data. The subcaches 62 and 64 are static random access memory devices, the former capable of storing up to 256k bytes of data, the latter of up to 256k bytes of instruction information. As illustrated, cache and processor buses 76 and 66 provide 64-bit transmission pathways, while instruction bus 68 provides a 64-bit transmission pathway.

In a preferred multiprocessor system constructed for use in practicing the invention, there is a hierarchy of storage. Particularly, each processing cell includes a subcache that contains 0.5 MBytes and a cache, e.g., elements 74A and 74B (FIG. 2), that contains 32 MBytes. Each cell, in turn, can form part of a domain(0) segment having, for example, 15 cells providing and a total of 480 MBytes of storage. Moreover, each domain(0) can form part of domain(1) segment having 32 domain(0) segments providing a total of 15360 Mbytes of storage. Such a hierarchical system is shown in FIG. 1C and is described in aforementioned incorporated-by-reference parent application U.S. Ser. No. 136,930, filed Dec. 22, 1987 (now U.S. Pat. No. 5,055,999).

A further understanding of the structure and operation of exemplary processing cell 18A and domain hierarchy may be attained by reference to including the components thereof, may be attained by reference to copending, commonly assigned U.S. Patent application No. 07/370,325, for MULTIPROCESSOR SYSTEM WITH MULTIPLE INSTRUCTION SOURCES, filed this day herewith, as well as to aforementioned parent patent application U.S. Ser. No. 07/136,930, now U.S. Pat. No. 5,055,999, as well as related patent applications U.S. Ser. No. 07/136,701, abandoned in favor of Ser. No. 509,480, filed Jun. 13, 1990, abandoned in favor of Ser. No. 696,291, filed Apr. 26, 1991, now U.S. Pat. No. 5,119,481 and U.S. Ser. No. 07/370,325.

Figure 3:
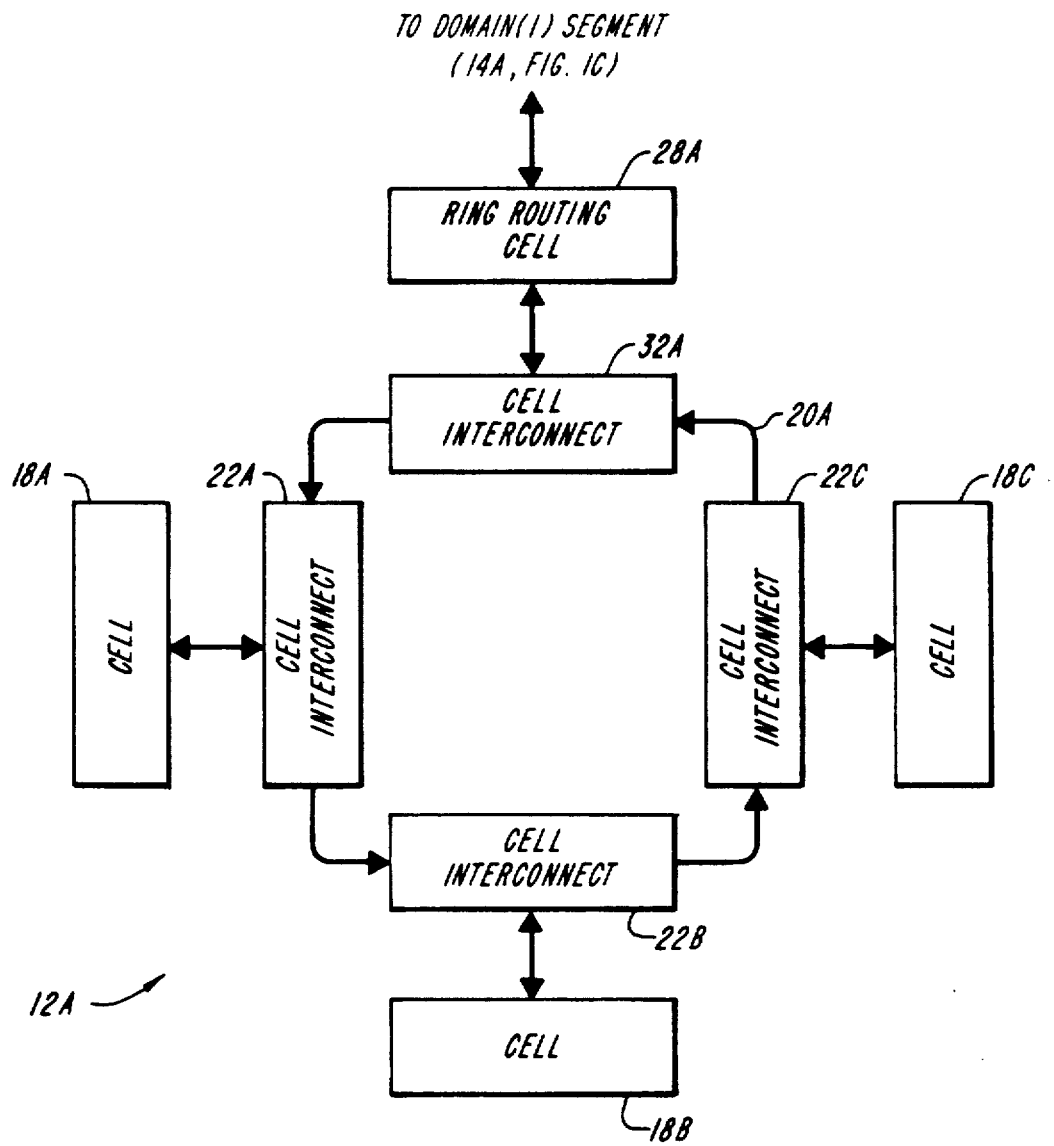
FIG. 3 depicts a preferred grouping of processing cells, i.e., a "domain(0) segment," of a preferred digital data processing system used to practice the invention.

FIG. 3 depicts a preferred configuration for interconnecting groups of processing cells along a unidirectional intercellular bus ring. The illustrated group, referred to as "domain(0) segment," 12A comprises processing cells 18A, 18B and 18C interconnected via cell interconnects 22A, 22B and 22c along bus segment 20A.

Cells residing within the illustrated segment communicate directly with one another over the bus 20A; however, the associated central processing units are not directly interconnected. Instead, interprocessor communications are carried out via the exchange of data and control signals stored in the memory elements. The memory management element 46 facilitates this transfer of information.

Communications between processing cells 18A, 8B, 18C of domain(0) segment 12A and those of similar other segments are routed via domain routing unit 28A.

A further understanding of the structure and operation of domain(0) segment 12A, as well as of domain routing unit 28A and mechanisms for providing interdomain communications, may be attained by reference to the aforementioned parent patent application U.S. Ser. No. 07/136,930. The structure and operation of illustrated bus segment 20A, as well as its interrelationship with cell interconnects 22A, 2B, 22C and 32A is more fully discussed in related U.S. Patent application 07/136,701.

The Memory Management System

A multiprocessing system 10 for use with a preferred embodiment of the invention permits access to individual data elements stored within processing cells 18A, 18B, 18C by reference to a unique system virtual address (SVA) associated with each datum. Implementation of this capability is provided by the combined actions of the memory management system 46, the subcaches 62, 64 and the caches 72A, 72B. In this regard, it will be appreciated that the memory management system 46 includes cache control units 74A, 74B, 74C and 74D, with their related interface circuitry. It will further be appreciated that the aforementioned elements are collectively referred to as the "memory system."

Processor Data Access Requests

Data access requests generated by a processor, e.g., 40A (FIG. 1A), are handled by the local memory element, e.g., 42A, whenever possible. More particularly, a controller, e.g., 74A, 74B, 74C, 74D (FIG. 2), coupled with each memory monitors the cell's internal bus. e.g., 66, and responds to local processor requests by comparing the request with descriptors listed in the corresponding directory. If found, matching data is transmitted back along the internal bus to the requesting processor.

In an effort to satisfy a pending information access request, the memory management element broadcasts an access-request signal received from the requesting central processing unit to the memory elements associated with the other central processing units. By way of a cell interface unit, described below, the memory management element effects comparison of the SVA of an access request signal with the descriptors stored in the directories 56A, 56B and 56C of each of the memory elements to determine whether the requested signal is stored in any of those elements. If so, the requested signal, or a copy thereof, is transferred via the memory management element 46 to the memory element associated with the requesting central processing unit. If the requested information signal is not found among the memory elements 42A, 42B and 42C, the operating system can effect a search among the system's peripheral devices (not shown) in a manner described below.

Data movement between processing cells is governed by a protocol involving comparative evaluation of each access request with the access state associated with the requested item. The memory management system responds to a request for exclusive ownership of a datum by moving that datum to the memory element of the requesting cell. Concurrently, the memory management element allocates physical storage space for the requested item within the requesting cell's data storage area. The management element also invalidates the descriptor associated with the requested item within the data store of the remote cell, thereby effecting subsequent deallocation of the physical storage space which had retained the requested item prior to its transfer to the requesting cell.

While the aforementioned operations result in exclusive storage of the requested datum within the requesting cell, other cells may subsequently gain concurrent access to that datum, for example, on a read-only basis. Particularly, the memory management system responds to a request by a first cell for read-only access to datum exclusively owned by a second cell by transmitting a copy of that datum to the first cell while simultaneously designating the original copy of that data, stored in the second cell, as "nonexclusively owned."

The system permits an owning cell to disable the copying of its data by providing a further ownership state referred to as the "atomic" state. The memory management system responds to requests for data in that state by transmitting a wait, or "transient," signal to requestors and by broadcasting the requested data over the hierarchy once atomic ownership is relinquished.

Data Storage Allocation and Coherency

Within the illustrated multiprocessor system, data coherency is maintained through action of the memory management element on memory stores 54A, 54B and 54C and their associated directories 56A, 56B and 56C. More particularly, following generation of an ownership-access request by a first CPU/memory pair (e.g., CPU 40C and its associated memory element 42C), the memory management element 46 effects allocation of space to hold the requested data in the store of the memory element of that pair (e.g., data store 54C of memory element 42C). Concurrent with the transfer of the requested information-representative signal from the memory element in which it was previously stored (e.g., memory element 42A), the memory management element deallocates that physical storage space which had been previously allocated for storage of the requested signal.

Figure 1B:
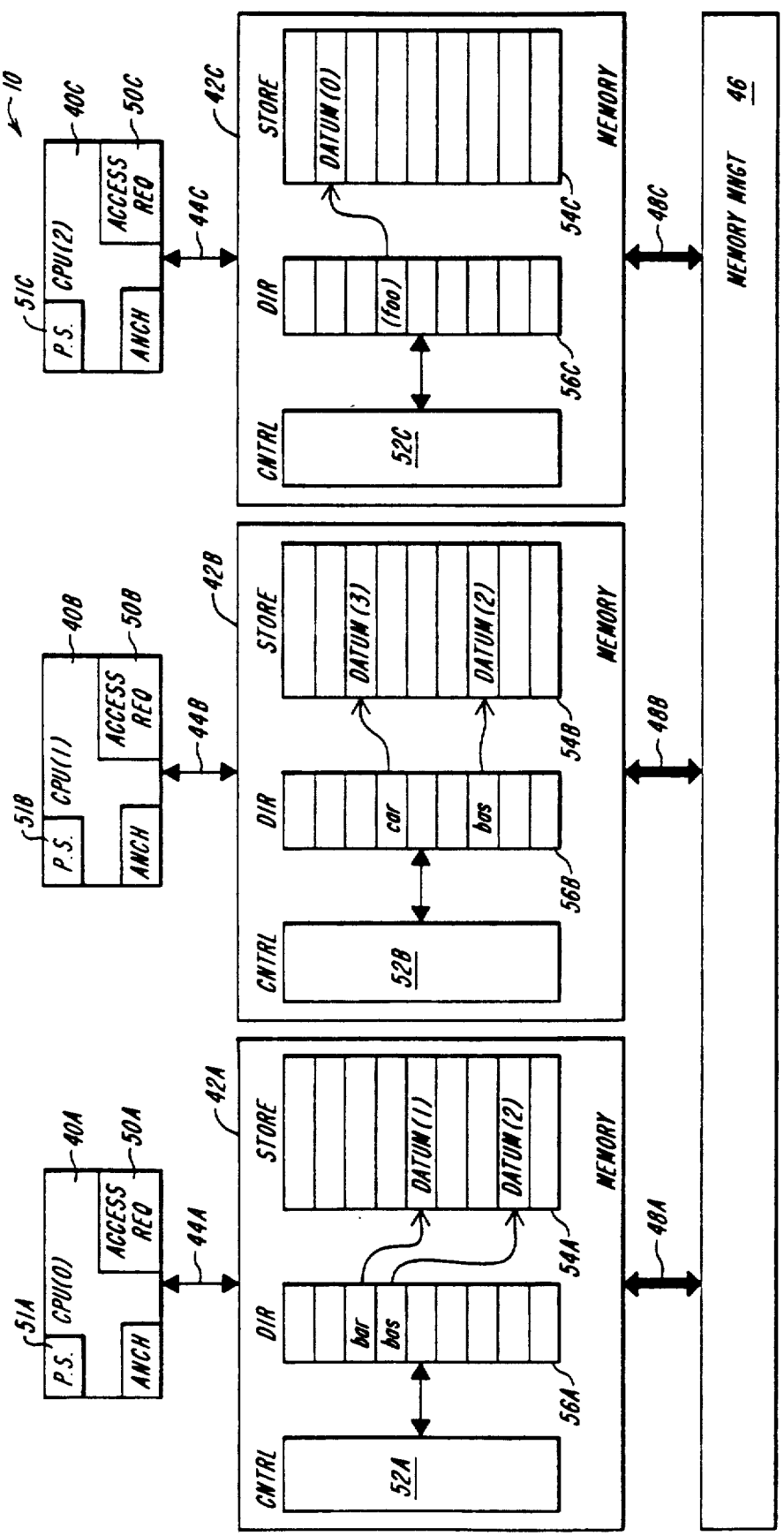
Figure 1C:
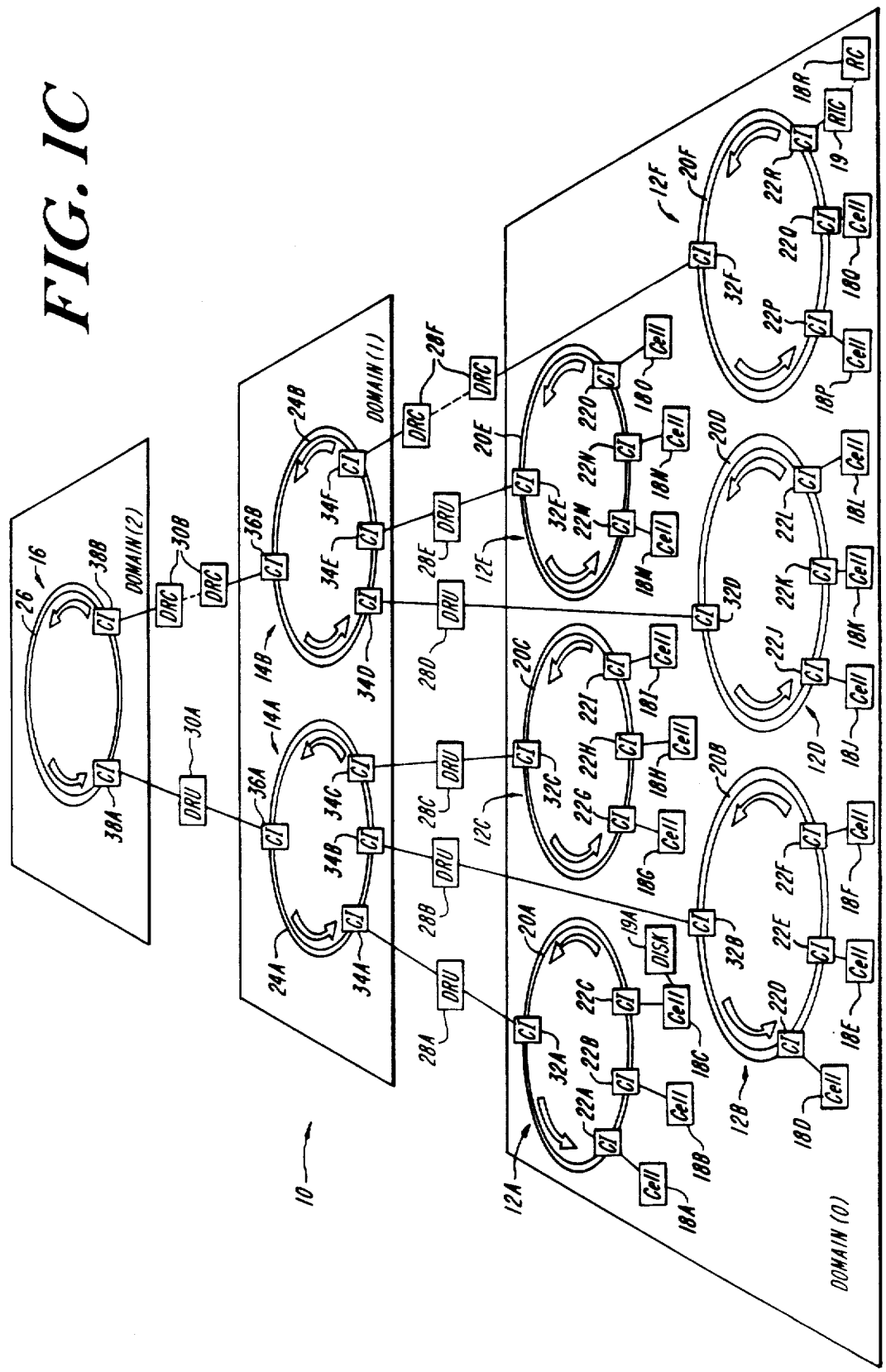

The aforementioned actions of the memory management element and, more particularly, the data coherence element are illustrated in FIGS. 1A and 1B. In the first of those drawings, information signals DATUM(0), DATUM(1) and DATUM(2) are shown as being stored in the data store of the memory element 42A, which is partnered with CPU 40A. Descriptors "foo," "bar" and "bas" correspond, respectively, to those data signals and are stored in directory 56A. Each descriptor includes a pointer indicating the location of its associated information signal in the store 42A.

In the memory element 42B, partnered to CPU 40B, the system stores information signals DATUM(2) and DATUM(3). Corresponding to these data elements are descriptors "car" and "bas," retained in directory 56B. DATUM(2), and its descriptor "bas," are copies of corresponding elements from cache 42A.

During normal operation, the illustrated data elements, i.e., DATUM(0) through DATUM(3), are accessible—at least insofar as their existence in the caches 42A, 42B, 42C is concerned—for request by each of central processing units. For example, upon receiving a request from CPU(2) for access to DATUM(2), associated with the descriptor "bas," the memory management element 46 signals the requesting processor that the requested datum resides in memory. Presuming, further, that the request is for read-only access and that DATUM(2) is not held in atomic state, then the memory management element transfers a copy of that datum to cache 42C, associated with CPU(2).

However, as indicated by the parenthesis surrounding the descriptor "car" in directory 56B, DATUM(3) is anchored. Thus, none of the central processing units, other than CPU(1) whose cache 42B stores the sole copy of that datum, can access DATUM(3). Particularly, the memory management system 46, noting that the anchor bit associated with the descriptor "car" is set, responds to an access request for DATUM(3) by either of the CPU's 40A, 40C by signalling those processors that the datum does not reside in memory. CPU(1) retains full access to DATUM(3), as that CPU accesses the datum directly, without intervention of the memory management system 46.

FIG. 1B illustrates responses of the memory management system 46 following issuance of a request for ownership access to a non-anchored datum. In particular, the illustration depicts the movement of non-anchored information signal DATUM(0) following issuance of an ownership-access request for that datum by CPU(2).

At the outset, the memory management element 46 allocates physical storage space in the store 54C of the memory element partnered with CPU 40C. The memory management element 46 then moves the requested information signal DATUM(0) from store 54A, where it had previously been stored, to the requestor's store 54C, while concurrently deallocating that space in store 54A which had previously held the requested signal. In addition to moving the requested information signal, the memory management element 46 also invalidates the descriptor "foo" in directory 56A, where it had previously been used to identify DATUM(0) in store 54A, and reallocation of that same descriptor in directory 56C, where it will subsequently be used to identify the signal in store 54C.

FIG. 1B also illustrates changes in the anchor state of data stored in the respective caches 42B, 42C. Particularly, as indicated by the absence of parenthesis in the corresponding directory entry, DATUM(3) is not anchored and, accordingly, is available for access by the other central processing units. Conversely, parenthesis surrounding the descriptor "foo" in cache 42C indicate that the associated datum, DATUM(0), is anchored and, thus, unavailable to the other CPU's. As above, CPU 40C can itself access DATUM(0) directly, notwithstanding that its anchor bit is set.

In a preferred embodiment of the invention, the anchor bit contained in each descriptor is set by the central processing unit associated with the cache in which that descriptor, as well as the corresponding information-representative signal, is stored. Thus, CPU 40A sets the anchor bits associated with data in cache 42A; CPU 40B sets the anchor bits associated with data in cache 42B; and CPU 42C set the anchor bits associated with data in cache 42C. As shown in the illustration, this anchoring functions are carried out by the functionality labelled "ANCH" in each of the CPU's 40A, 40B, 40C.

In the preferred embodiment, the memory management element 46 includes a mechanism for assigning access state information to the data and control signals stored in the memory elements 42A, 42B and 42C. These access states, which include the invalid, read-only, owner and atomic states, govern the manner in which data may be accessed by specific processors. A datum which is stored in a memory element whose associated CPU maintains priority access over that datum is assigned an ownership state. While, a datum which is stored in a memory element whose associated CPU does not maintain priority access over that datum is assigned a read-only state. Further, a purported datum which associated with "bad" data is assigned the invalid state.

Cache Structure

The memory system stores data in units of pages and subpages. Each individual cache describes 32 Mbytes of SVA space, subdivided into 2048 pages. Pages contain $2^{14}$ (16384) bytes, divided into 128 subpages of $2^7$ (128) bytes. The memory system allocates storage in the caches, e.g., 72A, 72B (FIG. 2), on a page basis, and each page of SVA space is either entirely represented in the system or not represented at all. The memory system shares data between caches in units of subpages.

When a page of SVA space is resident in the system, the following are true:

One or more caches, e.g., 72A, 72B, allocates a page of storage to the page, each subpage of the page is stored on one or more of the caches with space allocated, but Each cache with space allocated for a page may or may not contain a copy of all of the page's subpages.

As noted above, associations between cache pages and SVA pages are recorded by each cache in its cache directory, e.g., 56A. Each cache directory is made up of descriptors. There is one descriptor for each page of memory in a cache. At a particular time, each descriptor is said to be valid or invalid. If a descriptor is valid, then the corresponding cache memory page is associated with a page of SVA space, and the descriptor records the associated SVA page address and state information. If a descriptor is invalid, then the corresponding cache memory page is logically not in use. There is no explicit validity flag associated with a descriptor; a descriptor may be considered invalid if the anchor and held fields are both clear, and there are no valid subpages present for the SVA page.

Cache Layout

Figure 4:
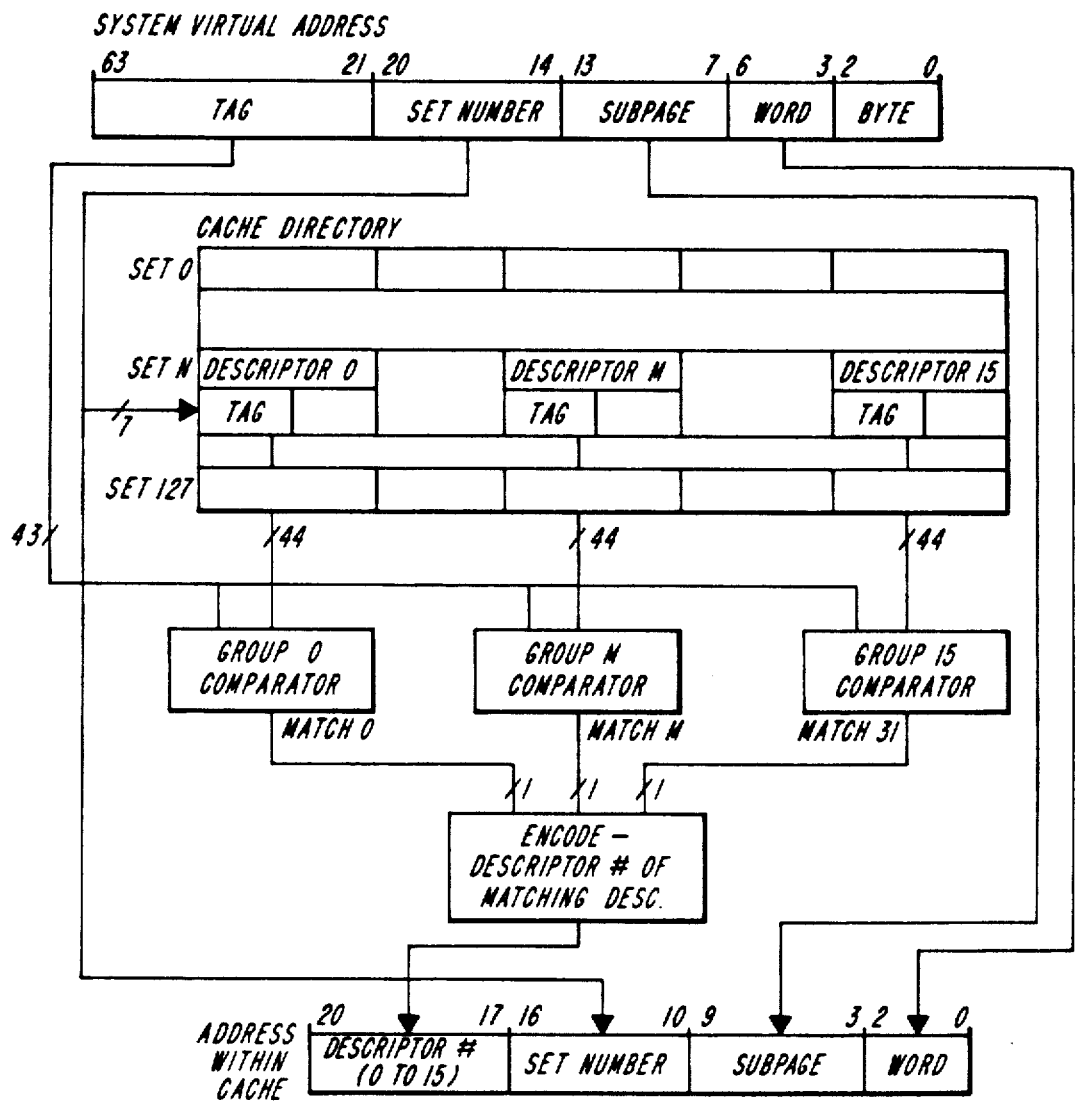
FIG. 4 depicts a preferred interrelationship between system virtual addresses, descriptors, and cache directories in a digital data processing system constructed according to a preferred practice of the invention.

The organization of the cache directory is shown in FIG. 4. When a reference to an SVA is made, the cache must determine whether or not it has the required information. This is accomplished by selecting a set within the cache, and then examining all the descriptors of that set. SVA[20:14] selects a set. In the general architecture, each of the descriptors in the selected set is simultaneously compared against SVA[63:21]. This teachings provided herein describe a $2^{40}$ byte SVA space, implying a comparison with SVA[39:21]. If one of the elements of the set is a descriptor for the desired page, the corresponding comparator will indicate a match. The index in the set of the matching descriptor, concatenated with the set number, identifies a page in the cache.

If more than one descriptor matches, the cache signals a multiple_descriptor_match exception. If no descriptor matches, the cache allocates a descriptor and requests data from the interconnect. It is possible that either the allocation or data request will fail, and the cache will indicate an error to the CPU.

The use of SVA[20:14] to select a set is effectively a hash function over SVA addresses. System software must assign SVA addresses so that this hash function gives good performance in common cases. There are two important distribution cases: referencing many pages of a single segment and referencing the first page of many segments. This set selector produces good cache behavior for contiguous groups of pages, since 128 contiguous pages will reside in 128 distinct sets. However, this selector will produce poor hashing behavior for many pages with the same value in SVA[20:14]. System software can avoid the latter situation by varying the logical origin of data within segments. For example, each per-process user stack can be started at a different segment offset.

The descriptor fields are defined as follows:

descriptor.tag (19)

Bits [39:21] of an SVA. This field identifies the particular page of SVA space specified by the corresponding descriptor. For a given set in a given cell, this field must be unique among all 16 descriptors. Software 'sets' this field when it creates an SVA page. It is also set by software during cache initialization.

descriptor.atomic_modified (1)

A cache sets this bit flag to one when any subpage of this page undergoes a transition into or out of atomic state because a gsp or rsp instruction was successfully executed. It is also set when a subpage changes from atomic state to transient-atomic state. This flag is not set if a gsp fails because the subpage is already in atomic state or if a rsp fails because the subpage was not in atomic state. This flag is not set if the gsp or rsp fails because descriptor.no_atomic is set. System software sets this flag to zero to indicate that it has noted the atomic state changes. This field is propagated from cache to cache.

descriptor.modified (1)

A cache sets this bit flag to one when any data is modified in the page. System software sets descriptor.modified to zero to indicate that it has noted the modification of the page. This flag is not set if an attempt to modify data fails because descriptor.no write is set. This field is propagated from cache to cache.

descriptor.LRU_position(4)

The cache maintains this field as the current position of the descriptor in its set from Most Recently Used (0) to Least Recently Used (15).

descriptor.anchor(1)

Software sets the field to indicate that data requests from other caches may not be honored nor may the descriptor be invalidated. Any read or get request from another cache returns unresponded to the requestor, and is treated as if the page were missing. This field is set by system software as part of creating or destroying an SVA page, and as part of modifying the page descriptor.

descriptor.held (1)

Software sets the field to indicate that the descriptor may not be invalidated by the cache even if no subpages are present in the cache.

descriptor.no_atomic (1)

Software sets this field to prevent any cache from changing the atomic state of any subpage of this page. An attempt to execute a gsp or rsp fails, and is signalled back to the processor. The processor signals a page_no atomic exception. descriptor.no_atomic can be altered even when some subpages have atomic state. This flag prevents attempt to change atomic state, in the same way that descriptor.no write prevents attempts to change data state. This field is propagated from cache to cache.

descriptor.no_write (1)

Software sets this field to prevent modifications to the page by the local processor. An attempt to modify the page fails, and is signalled back to the processor. The processor signals a page_no write exception. This flag does not affect the ability of any cache to acquire the subpage in exclusive or atomic/transient-atomic state. This field is propagated from cache to cache.

descriptor.summary (3)

Summarizes subpage state field of a set of subpages. There is one three-bit summary field for each set of subpages. The summary sometimes overrides the contents of the individual subpage_state fields for the subpages within the summary set.

descriptor.subpage_state (4)

The subpage state consists of a three-bit state field and a single bit subcached status field. It is set by the cache to record the state of each subpage and to indicate whether or not any portion of the subpage is present in the CPU subcache.

Descriptor.no_write can be used to implement a copy-on-access scheme, which in turn can be used as an approximation of 'copy-on-write'. When a process forks, the pages of the forking process's address space are set to take page_no_write exceptions. The child process's address space segments are left sparse. When the child process references a page that has not yet been written by the parent, the page fault is satisfied by making a copy of the corresponding page of the parent process, and descriptor.no_write is cleared for that page. If the parent writes a page before the child has copied it, the page_no_write handler copies the page into the child's address space and then clears descriptor.no write.

As discussed in further detail below, it is possible for a descriptor in a given cache to contain obsolete state information. Additionally, it should be noted that setting descriptor.held does not guarantee that the individual subpages will be present in the local cache or that the SVA page exists. System software can trap page reads by keeping a table of pages to be trapped, and refusing to create an SVA page for them. Then, it can translate missing_page exceptions into software generated page_no_read exceptions.

Descriptor Field Validity

As noted earlier, it is possible for flags in descriptors to be incorrect or out-of-date. There are two reasons for this: latency between a CPU and its local CCUs, and latency between the CCUs of different cells. The former can occur when a page which was previously unmodified is modified by the CPU. Until the modified subblock leaves the subcache, the local CCUs are not aware that a modification has occurred. The latter can occur because many caches may each contain a descriptor for a particular SVA page, and a state change affected by one cache is not automatically broadcast to all other caches. Because there is no valid bit associated with a descriptor, a descriptor always has the tag of some SVA page. However, if all the cache descriptors which have tags denoting a particular SVA page have no valid subpages in their descriptors, then the SVA page does not exist in the memory system. Similarly, if no cache descriptor has a tag denoting a particular SVA page, then that page does not exist in the memory system. It is possible to read the descriptor fields for such a page, but since the SVA page has logically been destroyed, the field values are not valid.

For example, consider two caches with descriptors for a page: cache A has all the subpages in exclusive state, and descriptor.modified is clear; no other cache has a descriptor for the page. The CPU of cell B executes a store instruction to modify subpage data. CPU B requests the subpage with an exclusive-ownership state from its local cache. The cache allocates a descriptor for the page and then requests the subpage using the ring. The owner (cell A) responds by yielding exclusive ownership to cell B. After the subpage arrives, cell B copies descriptor.modified (which is clear) from the response. Then the CPU of B loads a subblock from the subpage into its data subcache and modifies the subblock. At this point, the CPU subcache indicates that the subblock has been modified, but the local cache still show the subpage as unmodified. At some later time, CPU B will send the subblock data from its subcache to the local cache. This can occur because the CPU requires the subcache block for other data, because the CPU is using idle cycles to write-back modified subblocks, or because some other cell has requested the subpage. Then the cell B cache sets the descriptor.modified flag. Throughout this time, descriptor.modified is clear on cell A.

As a second example, assume that the system software running on cell A now destroys the SVA page. The page is destroyed by gathering up all subpages in exclusive state in cache A and then altering A's descriptor such that the SVA page no longer has any valid subpages. However, cache B still has a descriptor for the page. Fields such as descriptor modified are meaningless. Even if some other cache subsequently recreates the SVA page, cache B's descriptor will be out of date until the first subpage arrives.

System software must ensure that the SVA page is really present in the memory system when it attempts to use descriptor information. One method of accomplishing this is to always set the page anchor and obtain at least one valid subpage in the local cache. To be absolutely certain that the modified and atomic_modified fields are not set, software must first obtain every subpage in exclusive state. The anchor prevents any other cache from asynchronously acquiring any subpage already obtained. When the operation is complete, system software clears descriptor.anchor in the local cache. Then other cache request for subpages of that page will again be honored.

System software also needs to ensure that an SVA page does not really exist in the memory system before it creates the page. As noted above, the simple existence of a descriptor with the correct tag value does not indicate that the SVA page actually exists in the memory system. Software can verify non-presence by setting the page anchor and then attempting to fetch a subpage with exclusive state. If the fetch succeeds, software has lost a race, and the page exists in the memory systems. Otherwise, software can create the page using the mpdw instruction to establish the SVA page address with all subpages owned exclusively. Note that there still needs to be a software interlock against the simultaneous use of mpdw for this purpose.

Subcache Considerations

As shown in FIG. 2, each processor, e.g., 18A, contains an instruction subcache 62 and a data subcache 64; these are referred to as 'the subcache'. Once the instruction subcache 62 has been enabled, all CPU instructions are obtained from the instruction subcache. Most CPU load/store-class instructions operate on data in the subcache, although some operate directly on data in the local cache. Data moves from the local cache to the CPU as the CPU fetches instructions or when the CPU executes (most) load or store instructions. Data moves from the CPU to the cache when the CPU must re-use subcache space or when the local cache requests the data in response to a request from some other cell.

Subcache Structure

Referring to FIG. 2, each subcache 62, 64 describes 256 Kbytes of SVA space. The subcaches are based on 64 bit words, like the cache. The two sides of the subcache are similar in structure to the cache, but unit sizes differ. The subcaches store data in units of blocks and subblocks. The subcache is two-way set associative, and have 64 sets. Blocks contain $2^{11}$ (2048) bytes, divided into $2^5$ (32) subblocks of $2^6$ (64) bytes. The CPU allocates subcache space on a block basis; within a block, each subblock may or may not be present in a particular subcache.

The association between subcache blocks and SVA pages are recorded by each subcache in its subcache directory. Each subcache directory is made up of subcache descriptors. There is one descriptor for each block of memory in a subcache. A subcache descriptor can be said to be either valid or invalid. It is valid if any subblock within the block is valid. A subcache descriptor can only be valid if the local cache also has a valid descriptor for the same SVA page. Further, the state of each subblock within the block must be no 'stronger' than the state of the corresponding subpage in the local cache.

Subpages and Data Sharing

When a page is resident in the memory system, each of its subpages is resident in one or more of the caches, e.g., 72A, 72B. When a subpage is resident in a cache, the descriptor (in that cache) for the containing SVA page records the presence of that subpage in one of several states. The state of the subpage in a cache determines two things:
What operations that cache's local processor may perform on the data present in the subpage.
What responses, if any, that cache makes to requests for that subpage received over the domains from other caches.

The states of subpages in caches, e.g., 72A, B, change over time as programs request operations that require particular states. A set of transition rules specify the changes in subpage states that result from processor requests and inter-cache domain communications.

In order for a processor, e.g., 40A, to complete an instruction or data reference, several conditions must be simultaneously satisfied:

For instruction references, the subblock containing the data must be present in the instruction subcache. For most data operations, the subblock containing the data must be present with the appropriate state in the data subcache.

the subpage containing the data must be present in the local cache.

the local cache must hold the subpage in the appropriate state.

If the data is not present with the required state in the subcache, but is present in the local cache with correct state, the CPU obtains the data from the cache. If the local cache does not have the data in the correct state, it communicates over the domains to acquire a copy of the subpage and/or to acquire the necessary state for the subpage. If the cache fails to satisfy the request, it returns an error indication to the processor, which signals an appropriate exception.

The instruction set includes several different forms of load and store instructions that permit programs to request subpage states appropriate to the expected future data reference pattern of the current thread of control, as well as protocol between different threads of control in a parallel application. This section first describes the states and their transitions in terms of processor instructions and their effect on the caches.

Subpage States

The subpage states and their transition rules provide two general mechanisms to programs:

They transparently implement the strongly ordered sequentially consistent model of memory access for ordinary load and store accesses by the processors of the system.

They provide a set of transaction primitives that are used by programs to synchronize parallel computations. These primitives can be applied to a variety of traditional and non-traditional synchronization mechanisms.

The basic model of data sharing is defined in terms of three classes of subpage states: invalid, read-only, and owner. These three classes are ordered in strength according to the access that they permit. Invalid states permit no access. Read-only state permits load and instruction-fetch access. There are several owner states: all permit load access and permit the cache to respond to a data request from the interconnect; some permit store access. Only one cache may hold a particular subpage in an owner state at any given time. The cache that holds a subpage in an owner state is called the owner of the subpage. Ownership of each subpage moves from cache to cache as processors request ownership via store instructions and special load instructions that request ownership.

Basic States

The sections below describe the state classes and how they interact to implement the strongly ordered sequentially consistent model of memory access.

Invalid States

When a subpage is not present in a cache, it is said to be in an invalid state with respect to that cache. If a processor, e.g., 40A, requests a load or store to a subpage which is in an invalid state in its local cache, then that cache must request a copy of the subpage in some other state in order to satisfy the data access. There are two invalid states: invalid-descriptor and invalid.

When a particular cache has no descriptor for a particular page, then all of the subpages of that page are said to be in invalid-descriptor state in that cache. Thus, subpages in invalid-descriptor state are not explicitly represented in the cache.

When the CPU references a subpage in invalid-descriptor state, the local cache must allocate one of the descriptors (in the correct set) to the SVA. After the descriptor allocation is complete, all subpages in the page have invalid state.

When the local cache has a descriptor for a particular page, but a particular subpage is not present in that cache, then that subpage is in invalid state. The local cache will attempt to obtain the subpage data by communicating with other caches.

Read-Only State

There is only one read-only state: read-only. Any number of caches, e.g., 72A, 72B, may hold a particular subpage in read-only state, provided that the owner of the subpage holds the subpage in non-exclusive state. If the owner of the subpage has any other state (i.e. an exclusive-ownership state, one of: exclusive, atomic, or transient-atomic), then no read-only copies can exist in any cell. The CPU cannot modify a subpage which is in read-only state.

Owner States

There are two basic owner state types: non-exclusive and exclusive-ownership. When a particular cache holds a particular subpage in non-exclusive state, then some other caches may be holding that subpage in read-only state. Programmatically, non-exclusive state is the same as read-only state. The CPU cannot modify a subpage which is in non-exclusive state. Non-exclusive state is basically a book-keeping state used by the memory system: it defines the ownership of the subpage.

The exclusive-ownership states are exclusive, atomic, and transient-atomic. When a particular cache holds a particular subpage in an exclusive-ownership state, then no other cache may hold a read-only or non-exclusive copy of the subpage. If the local cache has a subpage in an exclusive-ownership state, the CPU can modify subpage data provided that the STT grants write access to the segment and the descriptor.no write flag is clear.

Atomic State

Atomic state is a stronger form of ownership than exclusive state. Subpages only enter and leave atomic state as a result of explicit requests by programs.

Fundamentally, atomic state can be used to single-thread access to any subpage in SVA space. When a processor executes a gsp.nwt (get-subpage, no-wait) instruction to request that a subpage enter atomic state, the instruction will only complete normally if the subpage is not in atomic state already. Thus, atomic state on a subpage can be used as a simple lock. The lock is locked when the gsp.nwt instruction completes normally by first obtaining the subpage in exclusive state and then changing state from exclusive to atomic. The lock is unlocked by executing the rsp (release-subpage) instruction. The rsp instruction requires that the subpage exist in some cache with atomic or transient-atomic state. The local cache obtains the subpage and then changes the subpage from atomic or transient-atomic state to exclusive state. (If the subpage has transient-atomic state, the operation is more complex, but the effect is programmatically the same.)

It is important to note that atomic state is associated only with a subpage; there is no association with a particular operating system process (typically a user program) or to a particular cell. It is possible for a process to execute gsp to get a subpage in atomic state and subsequently be switched by system software so that it continues execution on another cell. That process continues execution on the second cell and eventually executes an rsp instruction to release the subpage. Between those two instructions, there will only be a single copy of the subpage in the entire memory system, and it will be in atomic or transient-atomic state. As various processors execute instructions which reference the subpage, that single valid copy will move from cell to cell. It is also possible for a particular process to get atomic state, and another process to release atomic state.

Atomic state is an additional flag associated with a subpage; it is possible to implement protocols which use atomic state in addition to the data state of the subpage. Just as a Protocol which is implemented using only data can have errors, it is possible for an atomic-state protocol to be defective. The hardware does not impose any checking on the use of atomic state (beyond access control imposed by the STT and descriptor.no atomic).

Transient-Atomic State

The gsp.nwt instruction always completes within its defined execution time, but it can succeed or fail (depending upon the current state of the subpage in the memory system). A second form of the instruction is gsp.wt (get-subpage, wait), which will not complete until the subpage is obtained in exclusive state and changed to atomic state. The gsp.wt instruction relieves the programmer of the burden of determining whether or not the gsp instruction was successful. If the subpage is already in atomic or transient-atomic state when a processor, e.g., 40A, executes gsp.wt, the processor will stall until the subpage is released, obtained by the local cache, and changed back from exclusive state to atomic or transient-atomic state. Use of the gsp.wt instruction can reduce the number of messages sent between caches as a cell waits for the opportunity to 'lock the lock'.

Transient-atomic state is used automatically by the memory system to allow gsp.wt to function efficiently. Its use is entirely transparent to the programmer. If a subpage is in atomic state and another cache executes gsp.wt on that subpage, that subpage enters transient-atomic state in the holding cache. When the subpage is later released with an rsp instruction, the transient-atomic state forces the subpage to be expelled onto the interconnect in a special release state. The releasing caches, e.g., 72A, 72B, changes its own state for the subpage to invalid. Any cache which is executing a gsp will see the subpage and accept it. The accepting cache will then be able to complete its gsp instruction and the subpage will enter transient-atomic state in that cache. This operation will happen for each succeeding gsp and rsp until such time as an expelled subpage is not accepted by any other cache. At that time, the cache performing the release will change its subpage state back from invalid state (set when the subpage was released) back to exclusive state.

It is also possible that the packet with release state will be accepted by a cache whose CPU is performing a load or store instruction. The original cache sees that the subpage was accepted, and leaves its subpage in invalid state. The accepting cache allows its CPU to execute a single instruction before it retracts the subpage, sets its own subpage state to invalid, and sends the subpage out with release state. The cache which was executing the load or store is now the owner of the page, for purposes of this release. As before, if no other cache accepts the data, this cache will change the subpage state to exclusive state and retain ownership.

There is no limit to the time which a gsp.wt instruction may wait. The process which has issued the instruction will wait until the subpage is released. The instruction may be interrupted by various peripheral controller interface ("XIU") signals; when such an event occurs, the CCUs abandon the attempt to gain atomic access. If the subpage is released in the interim, and there is no other requestor, it will change from transient-atomic state release state and finally to exclusive state. Since the typical system software action is to service the interrupt and restart the interrupted instruction, the CCU will again issue the request. It may succeed or be forced to wait, as before.

State Transition

The basic mechanism by which data moves from some owning cache to other caches is by instruction fetches and the execution of load and store instructions by the processors local to those other caches. The different load and prefetch instructions permit programs to request that their local cache acquire read-only or an exclusive-ownership state; a store instruction always requires that the subpage have an exclusive-ownership state. In some circumstances, a cache may acquire a read-only copy of a subpage as it passes by on the interconnect. The post-store-subpage (pstsp) instruction broadcasts a read-only copy of a subpage to all interested caches. Finally, the owning cache may send ownership state on the interconnect as part of recombining a later. Instruction fetches and load instructions can result in the local cache requesting a read-only copy of the subpage. This request is answered by the cache which owns the subpage. If the owning cache has the subpage in non-exclusive state, it supplies a read-only copy to the requesting cache, but does not change its own state. If the owning cache has the subpage in exclusive state, it changes its own subpage state to non-exclusive and then supplies the read-only copy to the requestor. If the owning cache has the subpage in atomic or transient-atomic state, it supplies the subpage with that state and invalidates its own copy.

When a cache requests exclusive-ownership, the owning cache yields its copy of the subpage. If the subpage is owned with non-exclusive state, it is possible that there are read-only copies in other caches. All such caches react to the exclusive-ownership request by invalidating their read-only copies.

When a cache acquires a subpage with an exclusive-ownership state in order to satisfy a store instruction, it does not grant ownership or a read-only copy to another cache until the store instruction is complete. This rule provides the strongly ordered nature of the memory system, in that it ensures readers of a memory location see modifications in the order that they are made.

When a subpage is in atomic state it may change to transient-atomic state, but it will never change to any other state as a result of any load or store instruction. If some other cache requests the subpage, it will always obtain the subpage in atomic or transient-atomic state. After the subpage has been released to exclusive state, the transitions between exclusive and non-exclusive state may again occur, and read only copies may exist when the subpage is owned non-exclusively.

When a particular subpage is in invalid state in a particular cache (i.e., a descriptor is already allocated, but the particular subpage is not present), and a copy of that subpage is available on the domain interconnection due to a request from some other cache, the cache with invalid state will acquire a read-only copy of the subpage. The effect of this mechanism is to accelerate parallel computations, since it can remove the latency associated with requesting a copy of a subpage from another cache.

State Transition Transparency

It is important to note that the basic mechanisms provide the strongly ordered memory access model to programs that use simple load and store instructions. Programs may use the forms of the load, store, and prefetch instructions that request particular states in order to improve their performance, and it is expected that in many cases compilers will perform the necessary analysis. However, this analysis is optional.

Integrating Data and Synchronization

In simple transactions, subpage atomic state is used purely as a lock. The data in the subpage is not relevant. Some of the more sophisticated forms of synchronization mechanisms make use of the data in a subpage held in atomic state. One technique is to use atomic state on a subpage as a lock on the data in that subpage. Programs take one or more subpages into atomic state, manipulate their contents, and release them.

Cache Usage and Replacement Facilities

Each cache maintains LRU state for all of the resident pages. The LRU data is maintained separately for each of the 128 sets of the descriptor associative memory, and orders the 16 pages in the set according to their approximate time of last reference.

Basic LRU Maintenance

Each cache maintains an LRU to MRU ordering of the descriptors in each set. The ordering is maintained in descriptor.LRU_priority. Each of the descriptors in a set has a value from 0 (MRU) to 15 (LRU) in descriptor.LRU_priority. Conceptually, when a page is referenced it moves to MRU and all of the pages from MRU down to the references page's old LRU priority then move down one step towards LRU.

Descriptor Allocation Actions

When a new descriptor in a set is needed, the cache proceeds in order through as many of the following actions as needed to find a usable descriptor:
find an invalid descriptor
invalidate a read-only copy
destroy a pure SVA page
Signals a line_full exception if it cannot allocate a descriptor by the means described above.

The individual steps are explained below.

If an invalid descriptor exist it can be used immediately. This requires:
all subpages are in invalid state, and
descriptor.held and descriptor.anchor are both clear
no subpage of the page is described by a PRT entry To invalidate a read-only copy, if ctl$ccu lru_config.cde is 1, the cache attempts to identify a descriptor which contains only read-only copies of subpages. It searches from LRU to MRU, looking for any page which has:
all subpages in read-only or invalid state, and
no subcached subpages, and
an LRU value which is greater or equal to ctl$ccu_lru_config.cdl, and
descriptor.held and descriptor.anchor both clear, and
no subpage of the page is described by a PRT entry If an acceptable descriptor is found, all subpages are changed to invalid state and the descriptor is used.

To drop a pure SVA page, if ctl$ccu_lru config.pde is 1, the cache attempts to identify an SVA page which can be destroyed (removed entirely from the memory system). It searches from LRU to MRU, looking for a page which has:
all subpages in (various) exclusive-ownership states, and
no subcached subpages, and
descriptor.modified and descriptor.atomic modified both clear, and
LRU value which is greater or equal to ctl$ccu_lru_config.pdl, and
descriptor.held and descriptor.anchor both clear, and
no subpage of the page is described by a PRT entry If an acceptable descriptor is found, all subpages are changed to invalid state (thereby destroying the SVA page), and the descriptor is used.

Load and Store Instructions

A processor, e.g., 40A, passes load and store instructions to its local cache as requests when the subblock containing the referenced address is not present in the subcache in the required state. The different types of load and store instructions pass information to the local cache about the access patterns of the following instructions. For example, if the sequence of the instructions is a load followed by a store, and the subpage containing the data item is not yet resident in the local cache, it is more efficient to acquire ownership for the load instruction than to get a read-only copy for the load instruction and then communicate over the domains a second time to acquire ownership for the store instruction.

The state of subblocks in the subcaches does not always reflect the state of the corresponding subpage in the cache. The instruction subcache always obtains a read-only copy of data. The data subcache may hold a subblock in read-only or exclusive state, the subcache can only have exclusive state if the cache has an exclusive-ownership state and descriptor.no_write is not set. (The subcache does not distinguish between exclusive, atomic, and transient-atomic subpage states). When the subcache has a subblock in exclusive state, the CPU can execute store instructions by placing the new date in the subcache. For all store instructions except st64.nsc, if the subblock is not described by the subcache, or has invalid or read-only state, then the CPU must request exclusive state from the local cache prior to completing a store instruction. If descriptor.no_write is set or the subpage is not present in the memory system, a fault will occur.

When a request for a subpage arrives from another cache, the owning cache must respond. If any part of the subpage is in the data subcache, the local cache must ensure that it obtains any modifications which might be present only in the subcache. The cache also causes the CPU to change subcache state for the subblock to read-only or invalid, depending upon the request. In certain cases, the cache will also ensure that the instruction subcache invalidates its read-only copy of the subpage.

It is important to distinguish between the units of subcache management (blocks and subblocks) and the units of cache management (pages and subpages). Data travels between a CPU and its local cache in subblocks. Data travels between caches in subpages. There are two subblocks per subpage.

The different forms of load and store instructions are described below. Each description begins with a brief summary of the semantics of the instruction, and continues with an overview of subcache and cache actions.

load (read_only) [ld.ro]

load_64 (read_only, subcached) [ld64.ro.sc]

The program will continue a pattern of reading data. The minimum amount of work is done to obtain data. If the containing subblock is subcached, it is used directly. If the local cache does not have the subpage, it obtains a copy. The local cache supplies the subblock to the subcache with exclusive or read-only state, as appropriate.

load (exclusive) [ld.ex]

load_64 (exclusive, subcached) [ld64.ex.sc]

The program will write the subblock in the following instructions, and exclusive state is preferable to any other state. A program would use this when the data was expected to have little sharing, or when a series of writes was upcoming. This can reduce the number of interconnect messages required before the CPU can modify data.

A particular example of the use of load (exclusive) is per-program data such as stacks. Generally, there will be no read-only copies of such data, since the only copy will be the one in use by the program. However, if a program moves from one processor to another, the new processor's local cache will have no copy, and the old processor's local cache will continue to hold the subpage in an exclusive-ownership state. If the program used load (read_only), the local cache acquires the subpage in read-only state (unless the subpage is in atomic or transient-atomic state, in which case that state is acquired). The subsequent store requires the cache to make another interconnect request (to obtain an exclusive-ownership state) before any CPU data modification can occur.

As with ld.ro, the minimum amount of work is done to obtain data. If the subblock is already present in the subcache, it is used directly. If the local cache does not have the subpage, it requests the subpage in an exclusive-ownership state. When the local cache has the subpage, the subblock is supplied to the CPU in read-only or exclusive state, as appropriate.

store [st]

store_64 (subcached) [st64.sc]

If the subblock is already present in the subcache in exclusive state, subcache state is unchanged; data is written to the subcache.

The subcache must have the subblock in exclusive state. As necessary, the subcache will request exclusive state from the local cache, and the local cache will request an exclusive-ownership state from the interconnect.

If the descriptor.no_write flag is set, an error is signalled to the CPU which generates a page_no_write exception. Otherwise, the subcache obtains the subblock in exclusive state; data is written to the subcache.

load_64 (read_only, unsubcached) [ld64.ro.nsc]

load_64 (exclusive, unsubcached) [ld64.ex.nsc]

The programmer uses the exclusive and read_only designations according to the expected reference pattern, as documented for ld. However, the number of references to the subblock is expected to be small, and the subcache should not be disturbed while fetching this data.

If the data is present in the subcache, it is used directly. If the local cache does not have the subpage, it obtains a copy. The CPU obtains a copy of the data and loads the destination registers.

store_64 (unsubcached) [st64.nsc]

The number of references to the subblock is expected to be small (typically one), and the subcache should not be disturbed while storing this data.

If the subblock is subcached in exclusive state, the subcache state is unchanged and data is written to the subcache. If the subpage is subcached in read-only state it is immediately invalidated. The CPU supplies the data to the local cache. If the cache does not have the subpage in an exclusive-ownership state, it requests it from the interconnect.

If the descriptor.no_write flag is set, an error is signalled to the CPU which generates a page_no_write exception. Otherwise, the CPU data is written directly to the subpage in the cache.

instruction fetch

Instruction fetches always fetch subpages specifying read-only state.

Subpage Atomic State Instructions

The subpage atomic instructions are the program interface to the get and release operations described above. These instructions exist in several forms to permit precise tuning of parallel programs.

get subpage [gsp.nwt]

get subpage & wait [gsp.wt]

Get subpage requests that a subpage be set into atomic state. For both forms of the get subpage instruction, if the subpage is not in atomic state in any cache, then the local cache acquires it in atomic state.

For gsp.nwt, the @MEM condition code indicates the success or failure of the attempt; the instruction will trap instead of changing @MEM if the trap option is present in the instruction and the subpage is already atomic.

The gsp.wt instruction form causes the cache to stall the CPU until the subpage can be obtained in atomic state. This reduces the amount of interconnect traffic if the program must obtain atomic state before it can proceed. If the subpage is already atomic in any cache (including the local cache), the instruction waits until the subpage is released. The local cache then acquires the subpage in atomic state. The @MEM condition is always changed to indicate success.

release subpage [rsp]

Release subpage is used to remove a subpage from atomic state. If the subpage is not present in the local cache, it is first requested in via the interconnect. Once the local cache has exclusive ownership, rsp proceeds. If the subpage is not in atomic state then release subpage does not change the subpage state. In this situation, the CPU will trap if the trap modifier is present for the instruction. If the subpage is in atomic state, it is changed to exclusive state. If the subpage is in transient-atomic state, it is changed to exclusive state and expelled onto the interconnect so that any waiting cell may acquire atomic state.

Other Subpage Instructions

Post Store Subpage[pstsp]

Post-store subpage allows the program to expel a read-only copy of a subpage onto the interconnect. All caches with descriptors for the page will take a copy of the data. This instruction can be used to broadcast data as part of completing some operation, reducing the probability that some other cache will have to make a read request on the interconnect when it needs to use the data.

fetch Subpage [pcsp]

Prefetch Subpage requests that a copy of a subpage be acquired on the local cache in a specified state. The instruction can request read-only or exclusive state. A subsequent reference to the subpage blocks until the prefetch subpage has completed.

Updates from the Subcache to the Cache

If the local cache holds the subpage in exclusive state, then the processor propagates modifications to the cache when:
- the subpage is removed from subcache, or
- the local cache receives a request for a copy of the subpage. In this case, the local cache explicitly requests the updated copy.
- the CPU is stalled waiting for a CCU response to some request. This occurs when the CCU does not have the subpage in the state required by the CPU. When the CPU is stalled, it updates modified subpages in exclusive state to its local cache (background writeback).

A cache forces its local processor to remove a subpage from subcache in order to invalidate the subpage in response to a request from another cache.

Processor Side—Subcache Actions

FIG. 5 provides a specification of processor load/store class instructions and the state of the addressed subblock in the subcache. If a hit is indicated, the process or uses the subcache directly for loading or storing. If a miss is indicated, the process or communicates with he local cache.

'Manual' Control of the Memory System

As described above, the memory system is designed to support a virtual memory system with automatic data sharing and LRU maintenance. However, software can take explicit control of the memory system for special applications.

In normal use, all processors share SVA space, and data automatically moves from cache to cache in response to instructions (and control operations). Software can dedicate some or all of the memory on a cache to its local, unshared use. Such a system must partition SVA space among the caches, and use explicit control operations to move such data from cache to cache.

By setting descriptor.held in every descriptor, system software can prevent the cache from ever moving or destroying a page to make room for another page. The system software can then handle exceptions or perform explicit destroys as needed to multiplex each cache's memory.

In automatic mode, the memory system can configured as a shared memory multiprocessor. When various automatic features are disabled, the memory system can be configured to emulate more loosely coupled message-oriented architectures. Messages can be passed by references to special SVA ranges. Manual control of the memory system can be used to enforce a specific memory model more closely.

Memory System Control Instructions

Control operation permit the processor, e.g., 40A, to directly manipulate the memory system. There are two classes of control instructions: data movement and page state control. The data movement control instructions move pages and subpages of data from cache to cache in the system. The page state control instructions manipulate page descriptors.

Instruction Execution Model

CPU instructions result in cache commands which execute synchronously or asynchronously, depending upon the command. A CPU cache instruction occupies an entry in the cache PRT (a hardware table) while it is in progress. The PRT has four entries, so a maximum of four cache instructions may execute in parallel. Most CPU instructions result in assignment of a PRT entry which remains in use until the request is satisfied, providing synchronous behavior. For example, load/store instructions execute synchronously, so that certain software-controlled exceptions (such as missing page or unwriteable page) can be predictably resolved. The pcsp (prefetch-cache-subpage) and pstsp (post-store-subpage) instructions operate asynchronously, as described in following subsections.

Synchronous errors typically result in the CPU executing the trap sequence; further information can be obtained from CCU control locations, as described in the 'Control Locations' chapter.

Asynchronous errors result from actual hardware errors or are provoked by a request from some other cache. Such errors are reported by memory-system interrupts.

Prefetch Instruction

The prefetch instructions request that a copy of a subpage be acquired on the local cache in a specified state. Pcsp prefetches a subpage. The cache allocates a PRT entry when this instruction is detected. If the subpage is already present, the PRT entry is freed and the pcsp completes. Otherwise, the cache issues a request, and then indicates instruction completion to the CPU, which proceeds asynchronously. When the message returns as a request or response, the cache accepts data (if present), and frees the PRT entry. There is no indication to the CPU that the data has arrived.

Post-Store Subpage Instruction

The pstsp instruction requests that a copy of a subpage be circulated on the interconnect so that any caches having a descriptor for the containing page may acquire a read-only copy of the subpage. pstsp references a subblock within a subpage. If the subblock is subcached with exclusive state and is modified in the subcache, the CPU requests a post-store action from the local cache; otherwise, the pstsp instruction has no effect. The cache allocates a PRT entry, and requests the subpage data from the CPU. The cache then submits the post-store message to the interconnect, frees the PRT entry, and indicates instruction completion to the CPU. The CPU proceeds asynchronously. When the message returns to the issuing cache, it is discarded.

Fetch Subpage Instruction

The mfsva instructions permits system software to fetch a subpage in read-only or exclusive-ownership state, specifying the SVA location of the subpage. This saves system software the effort of establishing a DSTT translation, as is required by pcsp.

Flush Subcached Subpage Instruction

The mflsp instruction causes the cache to ensure that the specified subpage is not subcached in the local CPU. If the subpage is in invalid-descriptor state or invalid state, no descriptor is allocated and the subpage is not requested via the interconnect.

Recombine Subpage Instruction

The mrcsp instruction allows system software to reduce the number of active descriptors for a page by causing ownership to migrate to another cache. Unlike the background recombine activity of the cache, this instruction is not controlled by cache configuration parameters.

Page State Control Instructions

The page state control instructions operate on individual pages of SVA space.

Anchor Descriptor Instruction

The mpsa instruction provides an anchored descriptor in the local cache for an SVA page. If the descriptor already existed prior to the mpsa, its anchor flag is set. Otherwise, the cache allocates a descriptor and then sets the anchor flag. Page state control operations require that an anchored descriptor for the SVA page be present on the local cache.

Write Descriptor Instruction

The mpdw instruction is used to create and destroy SVA pages, and to change descriptor flags of existing SVA pages. mpdw requires that system software first obtain an anchored descriptor for the page, using the mpsa instruction. The following discussion assumes that an anchored descriptor exists on the local cache.

Creating an SVA page

Following the mpsa, the descriptor exists, but all subpages are in invalid state. System software executes mpdw specifying that all subpage states should be set to exclusive. This causes a message to be sent on the interconnect so that any interested ring members may note the creation of the page.

The SVA page now exists, although its data values are undefined. Software must initialize the page using store instructions or I/O before allowing the user to reference the page. For this reason, software will typically create a page at an SVA location inaccessible to user programs, initialize the page data, and then change the address of the SVA page as described below. The page is released for general use by executing an mpdw instruction which clears the anchor.

Destroying an SVA page

After the mpsa, system software must obtain all subpages in exclusive state. This is done using mfsva instructions. Software then executes mpdw specifying that all subpages should be changed to invalid state. This instruction causes a message to be sent on the interconnect so that any interested ring members may note the destruction of the page. The SVA page is destroyed by this operation. Software releases the descriptor for reuse by executing a second mpdw which clears the anchor.

Change Descriptor Fields

The mpdw instruction is used to change various fields in a local descriptor. It can set or clear the modified, atomic_modified, no_write, no atomic, and held fields and can clear the anchor field. mpdw can also change the tag, and thus the SVA space address associated with the descriptor. (Since the index of the descriptor forms part of the SVA, the new tag is in the same cache set, by definition.)

To ensure memory system consistency, system software must obey certain rules when altering the fields or tag of a descriptor. mpdw requires that descriptor.anchor be set (although the instruction itself may result in clearing descriptor.anchor). Various sequences require that all subpages be present in the local cache with an exclusive-ownership state. This is accomplished by setting descriptor.anchor and executing mfsva.ex for each subpage. Various sequences require that all subpages be unsubcached in the local cache. This is accomplished by executing mflsp for each subpage which might be subcached in the local CPU. (Executing mfsva.ex ensures that a subpage is not subcached in by the CPU of any other cell.)

The following list give the restrictions which are in force for each flag and the tag.
- anchor is set and (typically) cleared as part of any descriptor tag or flag modification. It may be left set for any duration, but in a shared-memory system, it is cleared as soon as possible.
- held can be modified to hold or unhold a descriptor on a particular cell without restriction.
- changing atomic_modified and no_atomic requires that all subpages be in an exclusive-ownership state in the local cache.—clearing modified and setting no write require that all subpages be in unsubcached in the local cache. This ensures that the local subcache does not have any subblock in exclusive state nor does it have any modified subblock. When changing modified no_write, system software may decide whether or not the change should be perceived by all cells which reference the page. Effecting a global change requires that all subpages be in an exclusive-ownership state in the local cache. (System software will typically make a global change when it clears the modified flag.) Effecting a local change does not require that any subpage be present in an exclusive-ownership state; however, this results in delayed perception of the new state.

changing the SVA page number (by changing the tag) requires that all subpages be in an exclusive-ownership state and unsubcached on the executing cell.

Changing single bit fields is accomplished with a single mpdw.desc instruction. This instruction contains the new value of the changed flag, the old values for the other flags and the tag. Unless system software has some special reason to keep the page anchored, it clears the anchor flag.

Changing the SVA page number of a descriptor is logically the same as destroying the old page and then creating a new page which happens to have the same data. The sequence is:

anchor a descriptor for the old SVA page and obtain each subpage in an exclusive-ownership state. If any subpage has atomic or transient-atomic state, it will be acquired by the executing cell. Once all subpages have been acquired, any access to the old SVA page will take a missing_page fault.

determine the atomic state of each subpage. This is most rapidly accomplished by executing gsp.nwt on each subpage, and examining the resulting @MEM indicator. Any cell which already executing a gsp.wt for a subpage of the old SVA will eventually take a timer interrupt; when the gsp.wt is restarted, it will take a missing_page fault.

use mpdw.alli to change all subpages to invalid state. This instruction causes the local CCUs to inform the local CIUs and the DRC (if any) that the SVA page is being destroyed. Even though all subpages are changed to invalid state, the data remains in the local CCUs.

use mpdw.desc to change the tag and set flags to desired state. The new anchor flag must be set.

use mpdw.allx to change all subpages to exclusive state. This instruction causes the local CCUs to inform the local CIUs and the DRC (if any) that an SVA page is being created. The old data is now perceived to be present in exclusive state.

restore saved atomic state of each subpage. For each subpage which was in atomic state, issue a gsp.nwt.

use mpdw.desc to clear the anchor flag.

The uses of descriptor.no_write include: prevention of inadvertent modification of certain data; support for copy_on_write/copy_on_access protocols; debugger watchpoints. In the first case, no_write is set and remains set. In the second case, when a program attempts to modify a page, system software can respond by making a copy of the page available to the other users and then clearing no write (see the system programming note 'Copy on Access', earlier in this chapter). Software can make this change local or global; in the former case, no write faults may continue to occur on other cells which reference the page. Finally, debugger watchpoints are intended to detect the modification of a particular region of context address space (e.g. find out where a global variable is being destroyed). System software can implement this by setting no_write for the page, and trapping every modification attempt. For modifications outside the watched range, system software can anchor the page, clear no_write, modify the data, unsubcache the data, set no_write, and proceed. (It is also possible to implement watchpoint support by making global changes to no_write.)

The mfpl instruction searches a specified set in the LRU space of the cache for a descriptor that matches a specified set of criteria. The search begins with the descriptor at LRU position 15, and proceeds upward until the criteria are met.

Instruction and Data System Address Space Split

To ensure correct operation, the cache must know when a subpage is also present in a CPU subcache. This permits the cache to request subcache invalidation when some request from the interconnect (or even the local CPU) requires a subpage state change.

As part of this mechanism, the CPU communicates with the cache when it changes subcaching status. However, the cache does not maintain per-subcache information. As a consequence, the same subpage of SVA space must not simultaneously appear in both subcaches. In general, this results in a system software restriction that the same SVA region cannot be used as both instructions and data. Self-modifying programs or programs where code and data are part of the same context address segment are not supported.

System software must take special care in the following cases:

changing an instruction, as when inserting or removing a breakpoint.

reading an instruction, as part of trap analysis or program disassembly by a debugger.

reading a page from an I/O device which will become an instruction page.

To read an instruction as data, system software must:

construct a DSTT entry which describes the SVA.— ensure the subpage is not present in the instruction subcache (use mflsp).

read the instruction as data (use ld64.nsc).

invalidate the DSTT entry.

To write an instruction subpage as data, system software must:

construct a DSTT entry which describes the SVA.

ensure the subpage is not present in any instruction subcache (use mpsa to anchor the page, and mfsva.ex to invalidate the subpage in all other caches and subcaches).

fetch the containing subblock (use ld64.nsc).

modify the subblock and write the instruction as data (use st64.nsc).

release the page anchor.

invalidate the DSTT entry.

Instruction pages are typically pure and do not need to be written from SVA space to an I/O device as part of system SVA space management. Before writing an instruction page, system software must:

ensure the subpage is not present in any instruction subcache (use mpsa to anchor the page, and mfsva.ex to invalidate the subpage in all other caches and subcaches). If this cell will never execute this instruction page, this step is not required.

perform the I/O.

ensure that the page is not present in the data subcache (use mflsp). If this cell will never execute this instruction page, this step is not required.

release the page anchor.

When reading an instruction page from an I/0 device into SVA space, system software must:

create the page (use mpsa to allocate and anchor the page, mpdw to complete page creation).

perform the I/0.

ensure that the page is not present in the data subcache (use mflsp). If this cell will never execute this instruction page, this step is not required.

clear the descriptor modified flag, set any other descriptor attributes such as subpage atomic state, and descriptor.no_write.

release the page anchor.

A further understanding of the structure and operation of a preferred multiprocessor digital data processing system constructed in accord with the invention may be attained by reference to appendices A, B, C, and D filed herewith, and available in the patented file.

It is seen that the aforementioned objects are met by the invention, embodiments of which are described above, providing a digital data processing system having a plurality of processing cells and a memory management element that moves exclusive data copies from cell to cell in response to access requests generated by the cells, and that permits the processing cells to "anchor" selected data to cause other cells which request that data from to be signalled that it does not reside in memory. Other aspects of the invention provide functionality that permits central processing units owning data elements to broadcast copies of those elements to other processors that previously retained copies, e.g., read-only, of the same data. A multiprocessing system constructed in accord with the invention features improved data coherency, reduced latency and bus contention, as well as unlimited scalability.

It will be appreciated that the embodiments depicted in the drawings and described above are illustrative only and that those skilled in the art may make changes in the illustrated constructions and sequences without departing from the scope of the invention.

What we claim is:

1. A digital data processing system comprising
   A. plural processing cells, each comprising a central processing unit and an associated memory element for storing information-representative signals, said plural memory elements together forming a common memory,
   B. each said central processing unit including access request means for generating an access-request signal representative of a request for access to an information-representative signal stored in said common memory, and
   C. each said processing cell including memory management means, coupled to the corresponding central processing unit and memory element of that processing cell, for selectively responding to an access-request signal for at least signaling the availability of an information-representative signal stored in that corresponding memory element, the memory management means of respective processing cells being coupled to one another for selective transfer of access-request signals therebetween,
   D. each said memory management means including directory means for storing an ANCHOR signal corresponding to each of at least selected information-representative signals in the corresponding memory element, said ANCHOR signal being indicative of a mode by which the corresponding information-representative signal is accessible,
   E. said memory management means including means for responding to an access-request signal generated by any of said central processing units directed to an information-representative signal having an ANCHOR signal indicative of a first alternative mode of access for at least signaling the requesting central processing unit that the requested information-representative signal is stored in said common memory, and
   F. said memory management means including means for responding to an access-request signal
      i) generated by the central processing unit corresponding to that memory management means and directed to an information-representative signal stored within the corresponding memory element, which information-representative signal is associated with an ANCHOR signal indicative of a second alternative mode of access, for signaling that corresponding central processing unit that the requested information-representative signal is stored in said common memory, and
      ii) generated by any other of said central processing units directed to that same information-representative signal for signaling the requesting central processing unit that the requested information-representative signal is not stored in said common memory.

2. A digital data processing apparatus according to claim 1, wherein
   A. said access request means include means for generating an ownership-request signal representative of a request for priority access to an information-representative signal,
   B. said memory management means include means for accessing information-representative signals stored in the respective memory elements and for responding to selected ones of said ownership-request signals for
      allocating, only within the memory element associated with the requesting central processing unit, physical storage space for the requested information-representative signal, wherein that space is the exclusive physical storage space for the requested information-representative signal with respect to all of said memory elements, and
      storing the requested information-representative signal in that exclusive physical storage space.

3. A digital data processing apparatus according to claim 2, wherein said memory management means comprise means responsive to selected ones of said ownership-request signals for deallocating physical storage space allocated in a memory element, other than the one associated with the requesting central processing unit, for storage of the requested information-representative signal.

4. A digital data processing system according to claim 1, wherein
   A. at least said selected central processing unit includes anchor request means for generating a request for placing an information-representative signal stored in the common memory in a selected one of said first and second alternative access modes, and
   B. the memory management means corresponding to the memory element storing that information-representative signal includes means selectively responsive to such request for setting corresponding the ANCHOR signal to be indicative of the selected access mode.

5. A digital data processing apparatus according to claim 4, wherein
   A. said access request means include means for generating an ownership-request signal representative of a request for priority access to an information-representative signal,
   B. said memory management means include means for accessing information-representative signals stored in the respective memory elements and for responding to selected ones of said ownership-request signals for
      allocating, only within the memory element associated with the requesting central processing unit, physical storage space for the requested information-representative signal, wherein that space is the exclusive physical storage space for the requested information-representative signal with respect to all of said memory elements, and
      storing the requested information-representative signal in that exclusive physical storage space.

6. A digital data processing apparatus according to claim 5, wherein said memory management means comprise means responsive to selected ones of said ownership-request signals for deallocating physical storage space allocated in a memory element, other than the one associated with the requesting central processing unit, for storage of the requested information-representative signal.

7. A digital data processing system according to claim 1, wherein
   A. at least said selected central processing unit includes anchor request means for generating a request for placing an information-representative signal stored in the corresponding memory element in a selected one of said first and second alternative access modes, and
   B. the memory management means corresponding to that central processing unit includes means selectively responsive to such request for setting the ANCHOR signal corresponding to that information-representative signal to be indicative of the selected access mode.

8. A digital data processing apparatus according to claim 7, wherein
   A. said access request means include means for generating an ownership-request signal representative of a request for priority access to an information-representative signal,
   B. said memory management means include means for accessing information-representative signals stored in the respective memory elements and for responding to elected ones of aid ownership-request signals for
      allocating, only within the memory element associated with the requesting central processing unit, physical storage space for the requested information-representative signal, wherein that space is the exclusive physical storage space for the requested information-representative signal with respect to all of said memory elements, and
      storing the requested information-representative signal in that exclusive physical storage space.

9. A digital data processing apparatus according to claim 8, wherein said memory management means comprise means responsive to selected ones of said ownership-request signals for deallocating physical storage space allocated in a memory element, other than the one associated with the requesting central processing unit, for storage of the requested information-representative signal.

10. A digital data processing system comprising
    A. plural processing cells, each including a central processing unit coupled to an associated memory element, each said memory element being capable of storing one or more information-representative signals,
    B. memory management means coupled to said plural memory elements for accessing one or more information-representative signals stored in said plural memory elements,
    C. at least a first central processing unit including means for generating a request for priority access to a selected information-representative signal for which physical storage space is allocated in the memory element associated with another central processing unit,
    D. said memory management means including means responsive to such request for
       i) allocating, within the memory element associated with the first central processing unit, physical storage space for said selected information-representative signal, and for storing that signal therein, and
       ii) invalidating copies of said selected information-representative signal, if any, stored in said physical storage space allocated to that information-representative signal in said other memory elements,
    E. said first central processing unit including means for generating a POST-STORE signal representative of a request for transfer of a copy of said selected information-representative signal to other memory elements having space allocated to that information-representative signal, and
    F. said memory management means including means responsive to such POST-STORE signal for transferring and storing a copy of said selected information-representative signal to the other processing cells having physical storage space allocated for said selected information-representative signal in the memory elements thereof.

11. A digital data processing apparatus according to any of claims 1-10, comprising:
    A. (n) information transfer domains, each respectively designated as information transfer domain(k), wherein (n) is an integer greater than or equal to two, and wherein (k) represents successive integers between (o) and (n−1), inclusive,
    B. information transfer domain (O) including a plurality of domain(O) segments, each such segment including a bus element connected to said memory management means for transferring signals between a plurality of said processing cells,
    C. each information transfer domain(k), for (k) between (1) and (n−1), inclusive including one or more corresponding domain(k) segments, wherein the number of segments in information domain(k) is less than the number of segments in domain(k−1), for each value of (k), and wherein information transfer domain(n−1) includes only one such segment.

12. A digital data processing apparatus according to claim 11, wherein each said domain(k) segment includes A. a bus element for transferring signals within that domain(k) segment, B. plural domain routing elements for transferring signals between that domain(k) segment and a domain(k−1) segment, each such routing element being connected for signal transfer with the respective domain(k) segment bus element and with the respective domain(k−1) segment bus element.

13. A method of operating a digital data processing system comprising

A. providing plural processing cells, each comprising a central processing unit and an associated memory element for storing information-representative signals, wherein said plural memory elements together form a common memory, B. storing, within each said processing cells, ANCHOR signals indicative of a mode by which each of at least selected information-representative signals is accessible, C. generating, within any of said central processing units, an access-request signal representative of a request for access to an information-representative signal stored in said common memory, and D. responding, within each of said processing cells, to an access-request signal generated by any of said central processing units directed to an information-representative signal having an ANCHOR signal indicative of a first alternative mode of access for signaling the requesting central processing unit that the requested information-representative signal is stored in said common memory, and E. responding, within a processing cell, to an access-request signal generated by the central processing unit of that cell directed to an information-representative signal stored in the memory element of that cell and having access for signaling that central processing unit that the requested information-representative signal is stored in said common memory, and responding to an access-request signal generated by any other of said central processing units directed to that same information-representative signal for signaling the requesting central processing unit that the requested information-representative signal is not stored in said common memory.

14. A method of operating a multiprocessor digital data processing system according to claim 13, including the steps of A. generating, within a selected one of central processing units, a request for placing an information-representative signal stored in the common memory in a selected one of said first and second alternative access modes, and B. selectively responding to such request for setting the ANCHOR signal corresponding to that information-representative signal to be indicative of the selected access mode.

15. A method of operating a multiprocessor digital data processing system according to claim 13, including the steps of generating, within a selected one of central processing units, a request for placing an information-representative signal stored in the corresponding memory element in a selected one of said first and second alternative access modes, and B. selectively responding to such request for setting the ANCHOR signal corresponding to that information-representative signal to be indicative of the selected access mode.

16. A method of operating a multiprocessor digital data processing system according to any of claims 13-15 comprising the steps of A. generating within a requesting one of said central processing units an ownership-request signal representative of a request for priority access to an information-representative signal, B. responding to at least selected such ownership-request signals for allocating, only within the memory element associated with the requesting central processing unit, physical storage space for the requested information-representative signal, wherein that space is the exclusive physical storage space for the requested information-representative signal with respect to all of said memory elements, and storing the requested information-representative signal in that exclusive physical storage space.

17. A method of operating a multiprocessor digital data processing system according to claim 16, wherein said responding step includes the further step of deallocating physical storage space, if any, allocated to the requested information-representative signal within the memory elements associated with central processing units other than the requesting one.

18. A method for operating a multiprocessor digital data comprising

A. providing plural processing cells, each including a central processing unit coupled to an associated memory element, each said memory element being capable of storing one or more information-representative signals, B. generating, within at least a first one of said central processing units, a request for priority access to a selected information-representative signal, said selected information-representative signal being one for which physical storage space is allocated in another of said memory elements, C. responding to said ownership-request signal for i) allocating within the memory element associated with the first central processing unit, physical storage space for said selected information-representative signal, and for storing that signal therein, ii) invalidating an information-representative signal stored in the physical storage space allocated to said selected information-representative signal in said other memory element, D. generating, within said first central processing unit, a post-store signal representative of a request for transfer of a copy of said information-representative signal to said other memory elements, and E. responding to said post-store signal for transferring a copy of said selected information-representative signal to said other processing cells for storage in the physical storage space allocated for said selected information-representative signal in said other memory elements.

19. A digital data processing system comprising

A. plural processing cells, each including a central processing unit coupled to an associated memory element, each said memory element being capable of storing one or more information-representative signals, B. memory management means coupled to said plural memory elements for accessing one or more information-representative signals stored in said plural memory elements, C. at least a first central processing unit including means for executing an ownership-access instruction for generating a request for priority access to a selected information-representative signal for which physical storage space is allocated in the memory element associated with another central processing unit, D. said memory management means including means responsive to such request for
   i) allocating, within the memory element associated with the first central processing unit, physical storage space for said selected information-representative signal, and for storing that signal therein, and
   ii) invalidating copies of said selected information-representative signal, if any, stored in said physical storage space allocated to that information-representative signal in said other memory elements.

E. said first central processing unit including means for executing a POST-STORE instruction for generating a POST-STORE signal representative of a request for transfer of a copy of said selected information-representative signal to other memory elements having space allocated to that information-representative signal, and F. said memory management means including means responsive to such POST-STORE signal for transferring and storing a copy of said selected information-representative signal to the other processing cells having physical storage space allocated for said selected information-representative signal in the memory elements thereof.

20. A method for operating a multiprocessor digital data comprising
   A. providing plural processing cells, each including a central processing unit coupled to an associated memory element, each said memory element being capable of storing one or more information-representative signals,
   B. executing, with at least a first one of said central processing units, an ownership-access instruction for generating a request for priority access to a selected information-representative signal, said selected information-representative signal being one for which physical storage space is allocated in another of said memory elements,
   C. responding to said ownership-request signal for
      i) allocating within the memory element associated with the first central processing unit, physical storage space for said selected information-representative signal, and for storing that signal therein,
      ii) invalidating an information-representative signal stored in the physical storage space allocated to said selected information-representative signal in said other memory element,
   D. executing, with said first central processing unit, a POST-STORE instruction for generating a POST-STORE signal representative of a request for transfer of a copy of said information-representative signal to said other memory elements, and
   E. responding to said POST-STORE signal for transferring a copy of said selected information-representative signal to said other processing cells for storage in the physical storage space allocated for said selected information-representative signal in said other memory elements.

* * * * *